(12) United States Patent
Ishii et al.

(10) Patent No.: US 6,422,602 B1
(45) Date of Patent: Jul. 23, 2002

(54) AIR BAG IN AIR BAG SYSTEM

(75) Inventors: Tsutomu Ishii; Tadashi Yamamoto; Masakazu Asano; Mitsuhiro Kikuta; Takashi Uemura, all of Aichi (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/686,166

(22) Filed: Oct. 12, 2000

(30) Foreign Application Priority Data

Oct. 14, 1999 (JP) ............................................ 11-292984
Mar. 14, 2000 (JP) ....................................... 2000-070620

(51) Int. Cl.⁷ ........................ B60R 21/20; B60R 21/22; B60R 21/16
(52) U.S. Cl. ................. 280/743.1; 280/731; 280/728.2; 280/728.3
(58) Field of Search ........................... 280/743.1, 728.2, 280/731, 728.3

(56) References Cited

U.S. PATENT DOCUMENTS

| 5,425,552 A | * | 6/1995 | Linder .................... 280/743.1 |
| 5,607,182 A | * | 3/1997 | Nelsen et al. ............. 280/743.1 |
| 5,681,052 A | * | 10/1997 | Ricks et al. ............. 280/743.1 |
| 5,716,068 A | * | 2/1998 | Sahara et al. ................ 280/731 |
| 5,794,974 A | * | 8/1998 | Niederman et al. ....... 280/743.1 |
| 5,899,495 A | * | 5/1999 | Yamamoto et al. ....... 280/743.1 |
| 6,092,839 A | * | 7/2000 | Nagano .................... 280/743.1 |

FOREIGN PATENT DOCUMENTS

| JP | 09277895 A | * | 10/1997 |
| JP | 10-175494 | | 6/1998 |
| JP | 11059310 A | * | 3/1999 |
| JP | 11263182 A | * | 9/1999 |

* cited by examiner

*Primary Examiner*—Lanna Mai
*Assistant Examiner*—Ruth Ilan
(74) *Attorney, Agent, or Firm*—Pillsbury Winthrop LLP

(57) ABSTRACT

An air bag wherein a peripheral wall portion on one side opposite to an opening for introducing an inflation gas is put on the side of a peripheral wall portion having the opening and flattened. The peripheral edges around the opening are folded together closer to the opening side at the first stage. Peripheral edges on the end portion side thus folded around the opening are folded at the second stage in such a manner as to set the peripheral edges closer to the opening side whereby to house the air bag in a casing. The region of an air bag cover which is positioned above and substantially closer to a center of the air bag thus folded up is thick-walled so that the region thereof may protrude downward from the periphery of the air bag.

8 Claims, 18 Drawing Sheets

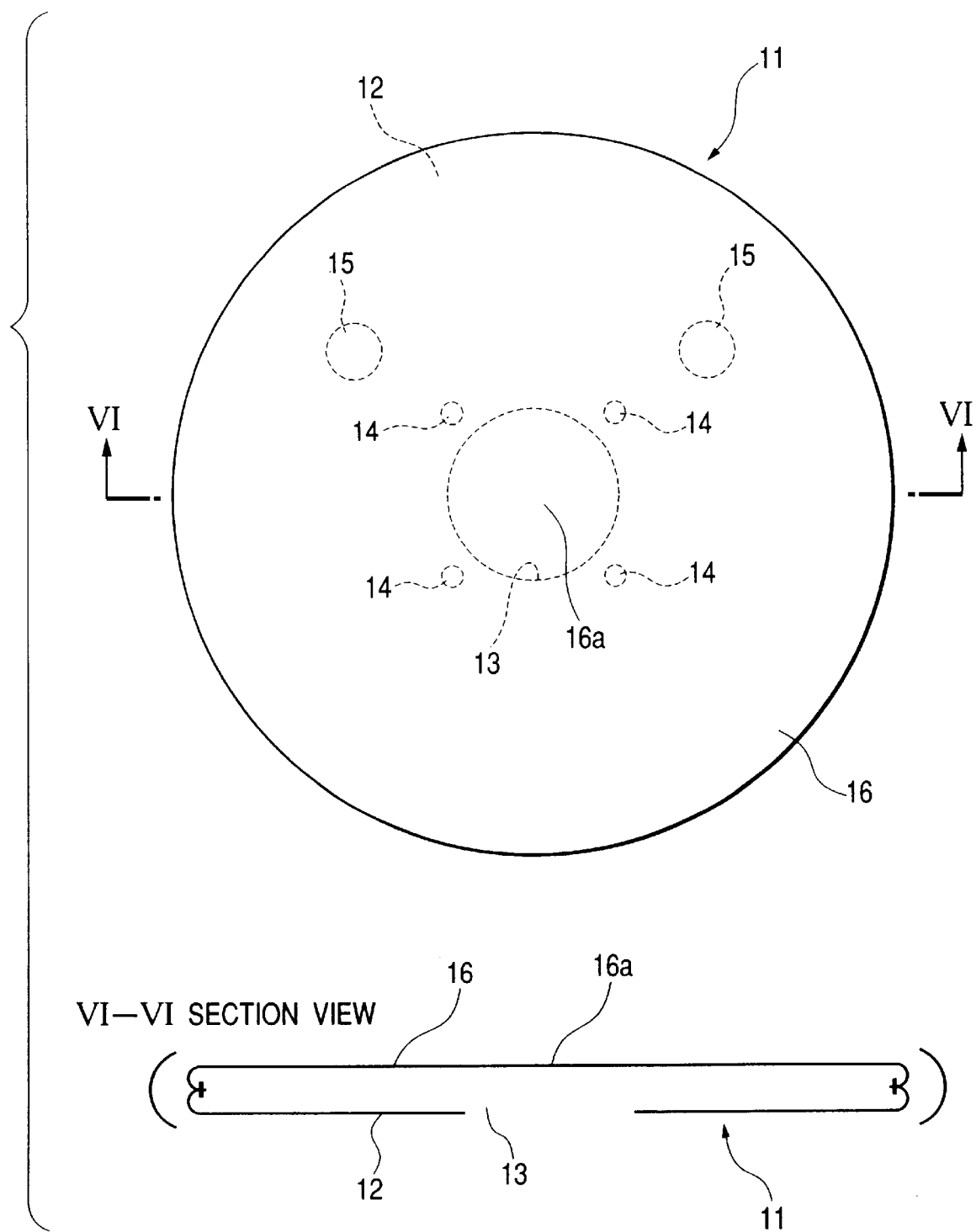

AIR BAG IN AIR BAG SYSTEM

BACKGROUND OF THE INVENTION

1. Field of Invention

The present invention relates to an air bag in air bag system installed in an automotive steering wheel and an instrument panel in front of the passenger seat.

The present application is based on Japanese Patent Applications No. Hei. 11-292984 and 2000-070620, which are incorporated herein by reference.

2. Description of the Related Art

There is a known an air bag system installed in a steering wheel as disclosed in JP-A-10-175494, for example, the air bag being folded up and housed in a casing.

More specifically, a peripheral wall portion on a side opposite to an opening for introducing an inflation gas is put on the side of a peripheral wall portion having the opening in such a manner as to set flatly developed peripheral edges closer to the opening side before being folded twice.

The folding at the first stage comprises the steps of forming a lateral crease, and putting the longitudinal edges of flatly developed peripheral edges on a side opposite to an opening under a bellows folding method so that the edges may be set closer to the opening.

The folding at the second stage further comprises the steps of forming a longitudinal crease, and folding the peripheral edges on the two lateral end portions around the opening under an outer roll folding method for winding the peripheral edges so that the edges may be set closer to the opening.

The air bag thus folded up at the two stages is fitted to the bag holder of a casing including the bag holder and an air bag cover (pad). Then the pad is coupled to the bag holder whereby to house the air bag in the casing.

An inflator for supplying an inflation gas to the air bag is simultaneously incorporated in the air bag system when the air bag is housed in the casing to complete the assembly work. Moreover, the air bag system utilizes the casing (bag holder) for being fitted to the steering wheel body coupled to the steering shaft of a vehicle whereby to assemble and mount the air bag system on the vehicle.

In the case of such a conventional air bag, however, the peripheral wall portion on the side opposite to the opening is put on the side of the peripheral wall portion having the opening for introducing the inflation gas to form a flatly developed air bag. Then the air bag is halved and folded up at the first stage and further the laterally long folded regions are again folded up at the second stage. The flatly developed air bag is ultimately folded into two packs and the problem is that finished air bag tends to become thicker.

In order to reduce the thickness of the air bag system as disclosed in JP-A-10-175494, the two packs thus folded up at the second stage have been distributed to the respective spaces on both sides of the inflator for supplying the inflation gas to the air bag.

Notwithstanding, though the distribution of the folded packs to the respective spaces of the inflator may result in reducing the thickness of the air bag, the shape of the folded air bag as viewed from above becomes larger and this makes it difficult to house the air bag in a compact casing.

Moreover, the region where the air bag is folded is disposed in the vicinity of the outer peripheral edge apart from the center of the inflator and the pack of the folded air bag is not disposed between the air bag cover region used to substantially cover the center of the folded air bag and the inflator, so that there existed a space therebetween. When a horn switch is turned on by holding down the air bag cover, the above region of the air bag cover may yield to the pressure in a case where the center of the air bag cover is substantially held down. In other words, the touch of the air bag cover has been bad.

Needless to say, the bad touch above has occurred in not only such an air bag cover for operating the horn switch but also an air bag cover with a horn button provided separately.

SUMMARY OF THE INVENTION

An object of the invention intended to solve the foregoing problems is to provide an air bag in an air bag system that can be housed in a compact casing.

Another object of the present invention intended to solve the foregoing problems is to provide an air bag system capable of improving the touch of its air bag cover.

An air bag in an air bag system according to the invention wherein a peripheral wall portion on a side opposite to an opening for introducing an inflation gas is put on the side of a peripheral wall portion having the opening in such a manner as to set flatly developed peripheral edges closer to the opening side before being folded twice whereby to house the air bag in a casing, is characterized in that the peripheral wall portion on the side opposite to the opening is put on the side of the peripheral wall portion having the opening and flatly developed; the peripheral edges in three directions around the opening are folded together closer to the opening side at the first stage; and the peripheral edges on the end portion side thus folded in the three directions around the opening are folded at the second stage in such a manner as to set the peripheral edges closer to the opening side whereby to house the air bag in the casing.

The folding at the second stage is preferably carried out under an outer roll folding method for winding each of the peripheral edges on the end portion side thus folded at the first stage on the side of the peripheral wall portion having the opening.

In this case, preferably, the casing is disposed in a boss portion in the center of a steering wheel; and the boss portion includes a space on its front portion side with respect to a ring portion to be held when the steering wheel is turned.

Further, the folding at the first stage is preferably carried out under a bellows folding method for folding the peripheral edges in the three directions around the opening on the side of the peripheral wall portion on the side opposite to the opening.

Preferably, further, the casing is disposed in the boss portion in the center of a three-spoke type steering wheel; and only one folded region out of those folded at the second stage is housed in the casing so that the region may be disposed on the front side of the steering wheel.

Further, the casing may be disposed in the boss portion in the center of a steering wheel with an inflator for generating the inflation gas disposed in the base wall portion; and only one folded region out of those folded at the second stage is disposed on the rear side of the inflator, whereas the remaining two folded region out of those folded at the second stage is disposed respectively on the lateral side of the inflator.

Further, the casing preferably has an inflator disposed in the base wall portion; and at least one folded region out of those folded at the second stage is housed in the casing with part of the one folded region being mounted on the inflator.

The air bag according to the invention is such that the peripheral edges in three directions around the opening are folded together closer to the opening side at the first stage where the flatly developed air bag is folded. Then the peripheral edges on the end portion side folded in the three directions around the opening are folded closer to the opening, so that the flatly developed air bag is ultimately folded into three packs by putting the peripheral wall portion opposite to the opening on the side of the peripheral wall portion having the opening for introducing the inflation gas.

In other words, since the air bag according to the invention consists of three folded packs, any one of the packs can be reduced in thickness and shape as viewed from top as compared with the conventional casing where two packs are formed.

Moreover, the three packs that are ultimately folded can easily be disposed radially around the opening. Since each one of the packs thus folded up is smaller in shape than the conventional pack, the air bag in top view after it has been completely folded up can be made smaller.

Therefore, the air bag in the air bag system according to the invention can readily be housed in a compact casing.

Under the outer roll folding method at the second stage, though the region opposite to the opening tries to protrude while canceling the folding of the three packs (folded regions) covering the region opposite thereto during the initial period of air-bag inflation, each pack wound on the side of the peripheral wall portion having the opening is hardly unwound because the pack is wound on the side thereof in comparison with the bellows or inner roll folding method (for folding the folded end portion on the side of the peripheral wall side opposite to the opening). Consequently, any region opposite to the opening is restrained from protruding.

When the folding of the three packs is canceled, the inflation gas is dispersed minutely in the three directions of the three packs, so that the flow rate of the inflation gas for canceling the folding of each of the packs is reduced. In other words, the region opposite to the opening is increasingly suppressed as the rate of cancellation of the folding of each pack is also suppressed.

Therefore, the adoption of the outer roll folding at the second stage makes it possible to prevent the initiation of air-bag inflation even though the air bag tries to interfere with a driver or passenger by lowering the pressure applied to the driver or the like.

When the conventional air bag is inflated, the folding of the two packs is canceled and the inflation gas is only divided in the two directions of these two packs, whereby the flow rate of the inflation gas that cancel the folding of each pack increases, thus accelerating the cancellation of the folding.

When the folding is carried out under the outer roll folding method at the second stage, the casing is disposed in the boss portion in the center of the steering wheel. Further, the provision of the space on the front side of the boss portion with respect to the ring portion gripped when the steering wheel is turned makes it possible for the air bag to escape into the space between the front side of the boss portion and the ring portion even though the air bag interferes with the driver in the proximity of the steering wheel, that is, suppressing the pressure of the air bag applied to the driver. In other words, the air bag causes its region opposite to the opening to protrude while canceling the folding of the three packs in the folded region during the initial period of inflation. As the three packs in the folded region are wound on the side of the peripheral wall portion having the opening, their winding is released in such a manner as to extend outward to move the driver without interfering with the driver when the driver in the proximity of the steering wheel interferes there with. When the ring portion interferes with the driver, the winding of the packs is released in such a way as to move down the ring portion. Consequently, the greater space between the front side of the boss portion and the ring portion allows the packs to enter the lower side of the ring portion, thus preventing the packs from projecting toward the driver side. Needless to say, the region opposite to the opening is as aforementioned restrained from protruding because of the outer roll folding and set the air bag free from interfering with the driver while moving the driver away, whereby the packs in the folding region enter the lower side of the ring portion while releasing their winding.

When the folding is carried out under the bellows folding method at the first stage, further, the crease is successively added from the peripheral edge side, so that the folding of the air bag is facilitated in comparison with the outer or inner roll folding.

With the casing disposed in the center of the three-spoke type steering wheel, only one folded region (pack) at the second stage is housed so that it may be disposed on the front side of the steering wheel, whereby the two folded packs other than what is disposed on the front side of the steering wheel are respectively disposed on the left and right rear sides of the boss portion of the steering wheel in top view. Thus, small folded packs can be disposed laterally and uniformly and in addition, as each of the folded packs is small, the folded air bag can easily be housed in the compact casing of the boss portion in the three-spoke type steering wheel.

In the case of the three-spoke type steering wheel, the spoke portion includes two spokes laterally extending from the boss portion and one spoke extending backward therefrom. The boss portion used to couple these three spokes is desired to be smaller in order to improve external design as well as meter visibility on the rear edge side of the boss portion as compared to that of any four-spoke type steering wheel, and this results in setting the spokes diagonally and linearly closer to the center of the boss portion. Therefore, the casing disposed in such an air bag system has been desired to be as compact as possible.

Further, the casing is disposed in the boss portion in the center of the steering wheel with the inflator for generating the inflation gas disposed in the base wall portion, and only one folded region out of those folded at the second stage is disposed on the rear side of the inflator, whereas the remaining two folded region out of those folded at the second stage is disposed respectively on the lateral side of the inflator, whereby the inflator heavier than the packs in the folded region of the air bag can easily be disposed on the front side of the casing. Moreover, the disposition of the heavy inflator on the front side of the casing allows the center of gravity of the air bag system to be set closer to the rotational center of the front-side steering wheel during its operation. Thus, the center of gravity balance of the steering wheel in operation is made improvable.

When the air bag system is installed in the boss portion of the steering wheel, a large space has been provided between the front side of the boss portion and the ring portion so as to improve the meter visibility. In other words, the center of gravity of the air bag system is situated on the rear side further than the rotational center of the steering wheel in operation.

When the casing having the inflator for generating the inflation gas is disposed in the base wall portion, at least one folded region out of those folded at the second stage is housed in the casing with part of the one folded region being mounted on the inflator whereby to the air bag is ultimately folded into three packs according to the invention. In comparison with the conventional case where the air bag is folded into two packs, one pack can be decreased in thickness and shape in top view and so the thickness of the completely folded air bag system even though part of the folded region is mounted on the surface of the inflator. Accordingly, the shape of the completely folded air bag is also reducible in top view since part of the folded region is mounted on the surface of the inflator, so that the air bag may be housed in a more compact case.

An air bag system according to the invention wherein a flatly developed air bag is folded substantially closer to the center of the air bag and contained in an air bag cover and wherein the region of the air bag cover which is positioned above and substantially closer to the center of the air bag thus folded up is thick-walled so that the region thereof may protrude downward from the periphery of the air bag.

The air bag system wherein after the air bag is flatly developed with its peripheral wall portion which has an opening for introducing an inflation gas and is placed on top of a peripheral wall portion on the side opposite to the opening is preferably such that peripheral edges in three directions around the opening are folded so as to be set closer to the opening at a first stage, and the peripheral edges on the sides of end portions thus folded in the three directions around the opening are folded again so as to be set closer to the opening at a second stage whereby to have the air bag contained in a casing.

As the region of the air bag cover which is positioned above and substantially closer to the center of the air bag thus folded up is thick-walled so that the region thereof may protrude downward from the periphery of the air bag, the thick-walled region is allowed to enter the pack-to-pack space of the folded air bag. Consequently, even though the region is held down, the thick-walled portion is supported by part of the air bag with the effect of preventing the air bag cover from being.

In the air bag system according to the invention, the touch of the air bag cover is improvable.

Further, the air bag is finally folded into three packs after the air bag is flatly developed with its peripheral wall portion which has an opening for introducing an inflation gas and is placed on top of a peripheral wall portion on the side opposite to the opening.

In comparison with the conventional arrangement of folding an air bag into two packs, the air bag of the invention folded into three packs is able to decrease the thickness and shape of one pack in plan view. Therefore, the thickness of the completed air bag after assembly is reducible.

Moreover, the air bag according to the invention has ultimately three folded packs radially around the opening with each folded pack being by far smaller than the conventional one, so that the air bag in plan view can be made smaller.

In the air bag system as claimed in claim 2 according to the invention, the air bag can readily be contained in a compact casing.

Features and advantages of the invention will be evident from the following detailed description of the preferred embodiments described in conjunction with the attached drawings.

BRIEF DESCRIPTION OF THE DRAWINGS

In the accompanying drawings:

FIG. 6 shows a plan view of a flatly developed air bag according to the embodiment of the invention;

DETAILED DESCRIPTION OF THE PREFERRED EMBODIMENTS

An embodiment of the present invention will now be described with the reference to the drawings.

An air bag system M with an air bag 11 being used therein is intended for a steering wheel W1, the air bag system M being disposed in a boss portion B in the center of the steering wheel W1.

Figure 1:
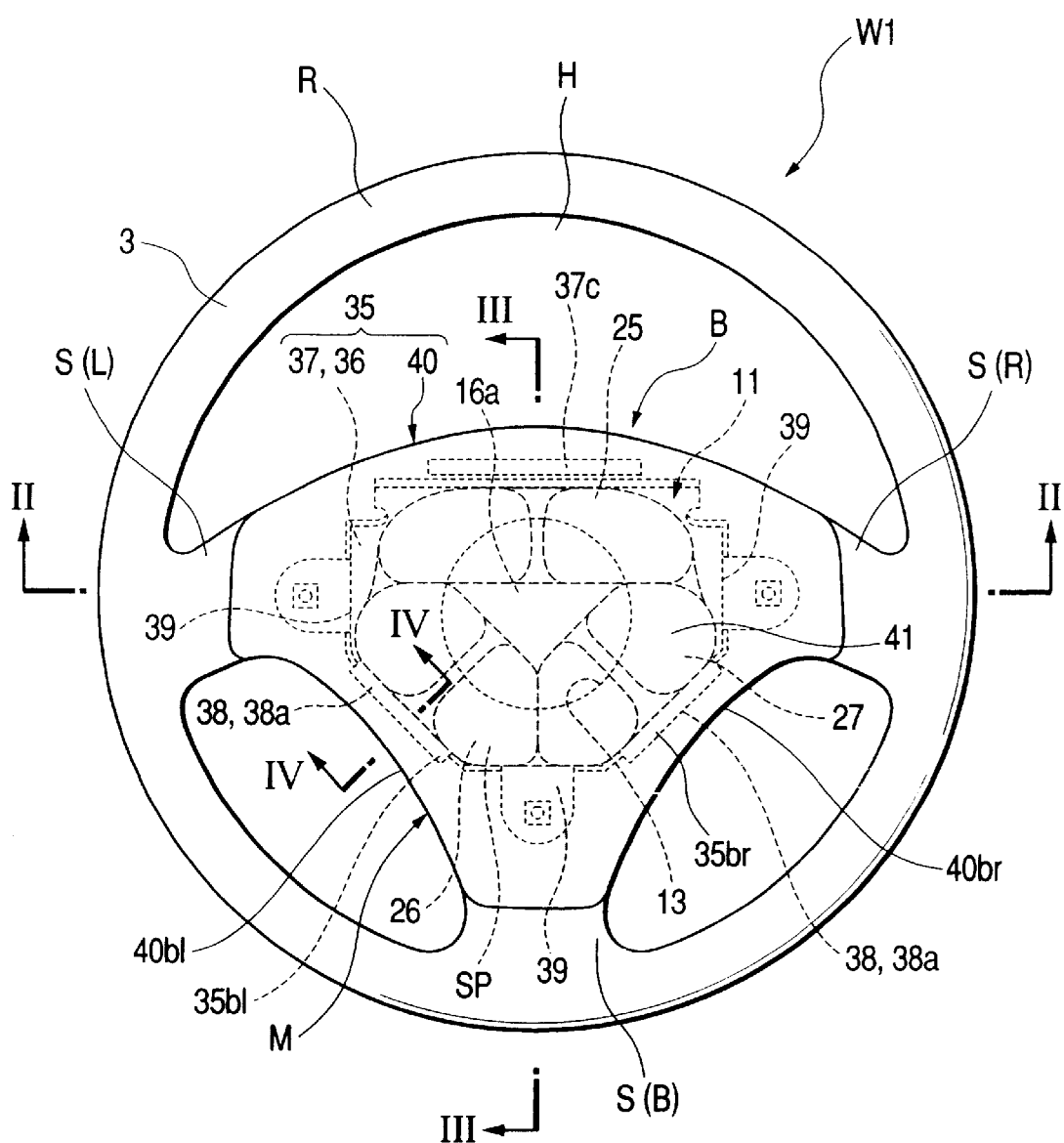
FIG. 1 shows a plan view showing a mode of using an air bag system using an air bag embodying the invention.
Figure 2:
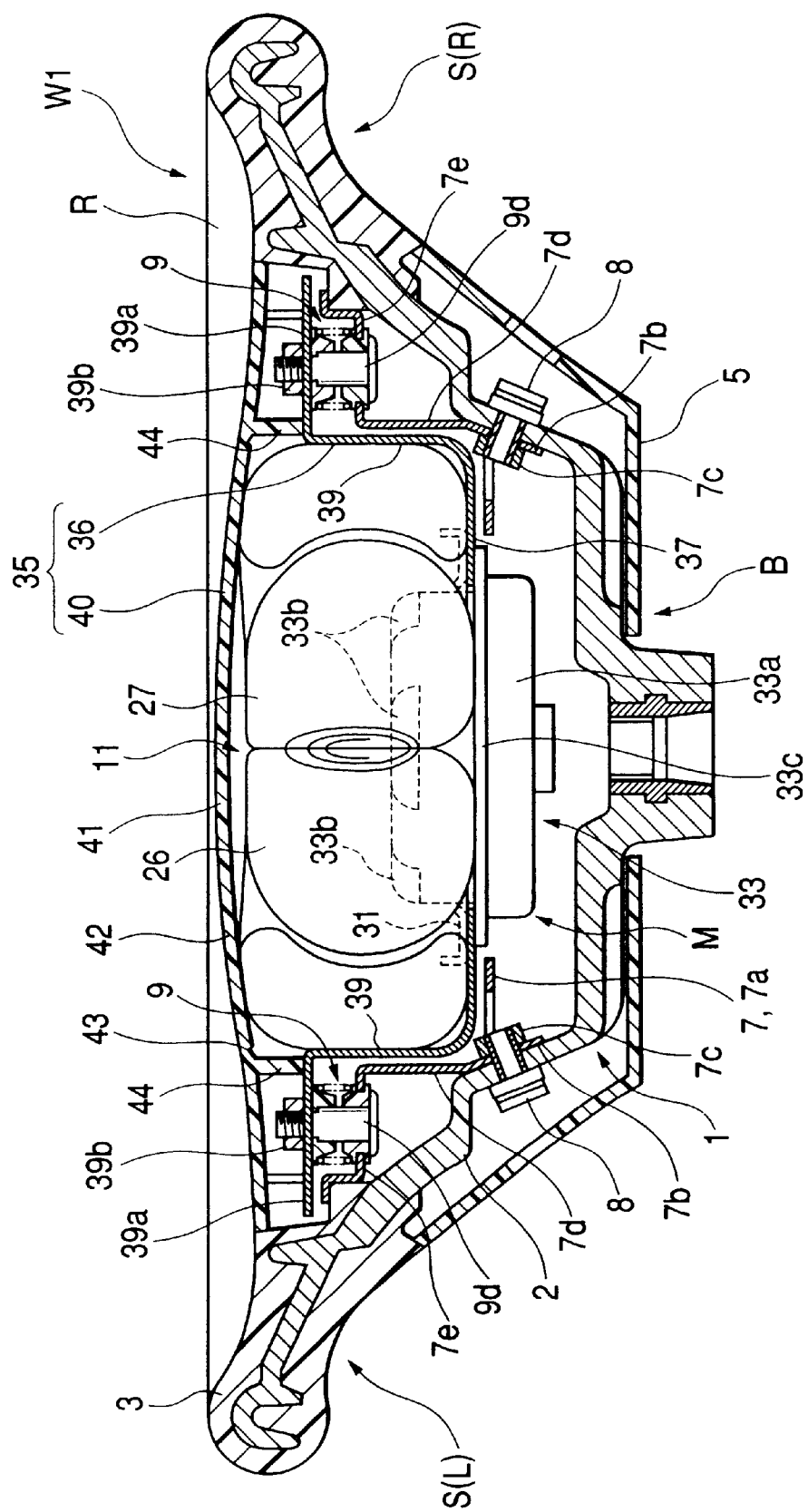
FIG. 2 shows a schematic section view of the air bag system taken on region II—II of FIG. 1 according to the embodiment of the invention.
Figure 3:
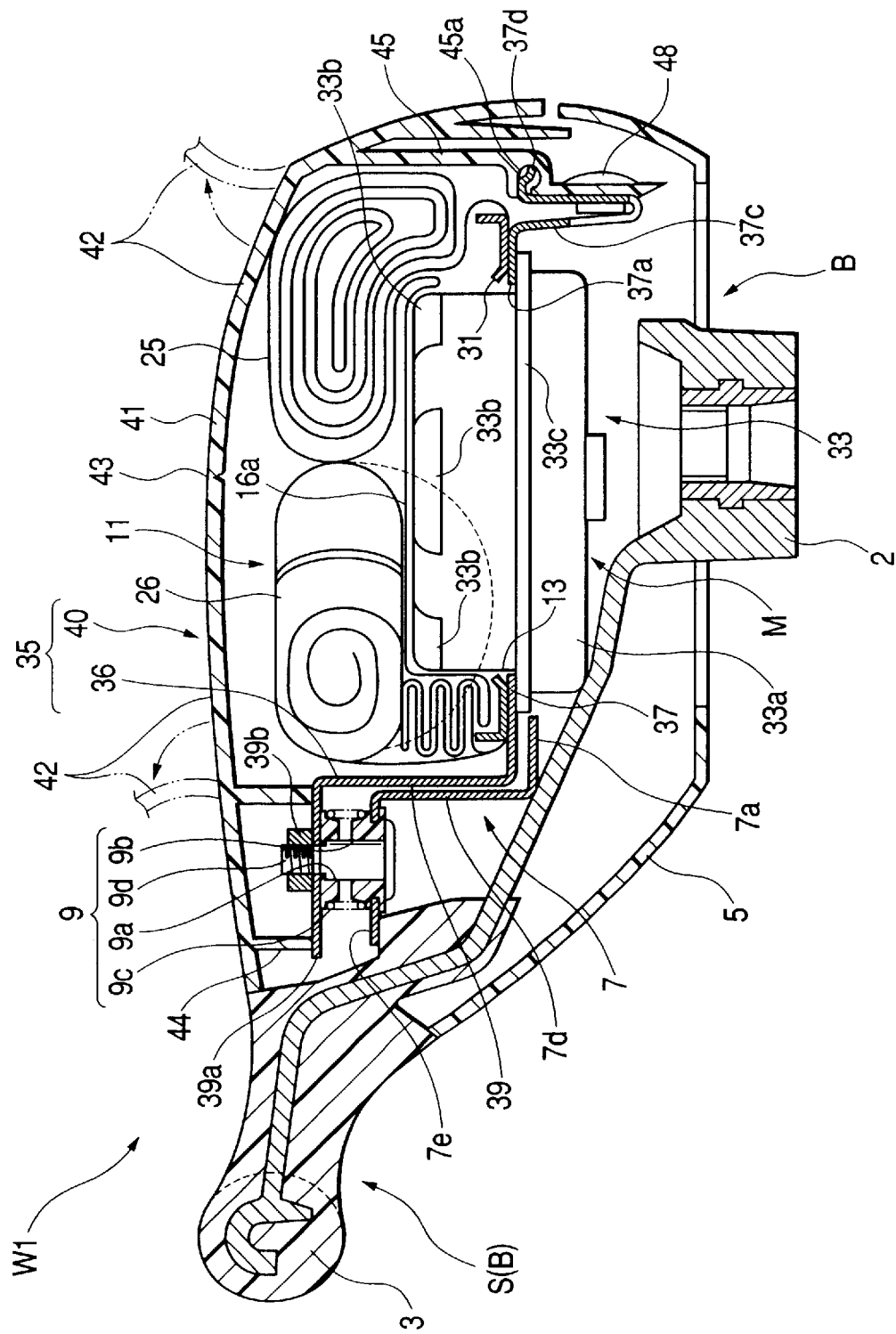
FIG. 3 shows a schematic section view of the air bag system taken on region III—III of FIG. 1 according to the embodiment of the invention.

The steering wheel W1 is of a three-spoke type and comprises a ring portion R to be gripped during the time the steering wheel W1 is turned, the boss portion B coupled to a central steering shaft (not shown) and a spoke portion S including three spokes that are coupled to the boss portion B and the ring portion R. The spoke portion S includes spokes SL and SR laterally extending from the boss portion B on the front side of a vehicle, and a spoke SB extending backward from the boss portion B on the rear side of the vehicle. A space H for increasing meter visibility is provided between the front side of the boss portion B and the ring portion R, the space H occupying substantially the first half the steering wheel W1. As shown in FIGS. 1–3, the steering wheel W1 includes the air bag system M, and a steering wheel body 1 including a steering wheel core bar 2 that is made of aluminum alloy and fitted in the portions R, B and S, a plastic coating layer 3 for coating the core bar 2 in the ring portion R and each of the spokes S on the side of the ring portion R, and a plastic lower cover 5 fitted to the lower portion of the boss portion B. Further, the steering wheel body 1 includes a support plate 7 for supporting the air bag system M, and three horn switch mechanisms 9 held between the air bag system M and the support plate 7.

Each of the horn switch mechanisms 9 is so arranged as to actuate the horn by bringing conducting parts 9a and 9b into contact with each other when a pad 40 as an air bag cover, which will be described later, of the air bag system M is depressed. Each of the horn switch mechanisms 9 is also disposed on the back side of the pad 40 near each of the spokes SL, SR and SB. While the horn is not actuated, the contacts 9a and 9b are separated by a coil spring 9c (see FIG. 3) in such a way that the gap between the contacts 9a and 9b is kept constant by means of a fluted bolt 9d. Each of the fluted bolts 9d is inserted through the support portion 7e, which will be described later, of the support plate 7 and screwed into a nut 39b provided to a bag holder 36 forming the casing of the air bag system M.

The support plate 7 made from sheet metal includes a base portion 7a disposed in its lower portion, a vertical plate portion 7d extending upward from near each of the spokes SL, SR and SB, and the support portion 7e extending outward from the upper end of the vertical plate portion 7d. The base portion 7a is U-shaped in top view to prevent it from interfering with an inflator body 33a, which will be described later, of the air bag system M, a fitting piece 7b for securing a nut 7c being provided near each of the lateral spokes SL and SR of the base portion 7a. Each fitting piece 7b is fixedly coupled to the core bar 2 with a bolt 8 to be screwed into the nut 7c. In this case, the support plate 7 is used to support the air bag system M with the respective horn switch mechanisms 9 held therebetween via the fitting pieces 7b and 7b fixed to the core bar 2 with the bolts 8 and front ends of the respective support portions 7e butted against the coating layer 3.

As shown in FIGS. 1–3, the air bag system M includes the folded air bag 11, an inflator 33 for supplying a gas to the air bag 11, and a casing 35 for holding the air bag 11 and the inflator 33 by covering the folded air bag 11.

Figure 4:
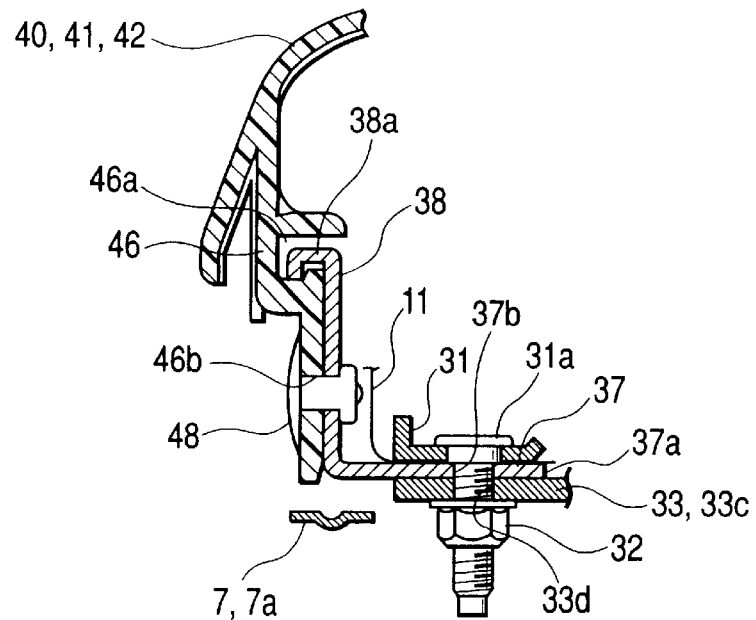
FIG. 4 shows a schematic partial section view of the air bag system taken on region IV—IV of FIG. 1 according to the embodiment of the invention.

The inflator 33 essentially consists of a substantially columnar body 33a having a gas discharge port 33b for discharging the inflation gas in its upper portion, and a substantially square platelike flange portion 33c disposed on the outer peripheral face of the body 33a. As shown in FIG. 4, further, the flange portion 33c is formed with four through-holes 33d for receiving the bolts 31a of retainers 31 as will be described later.

Figure 5:
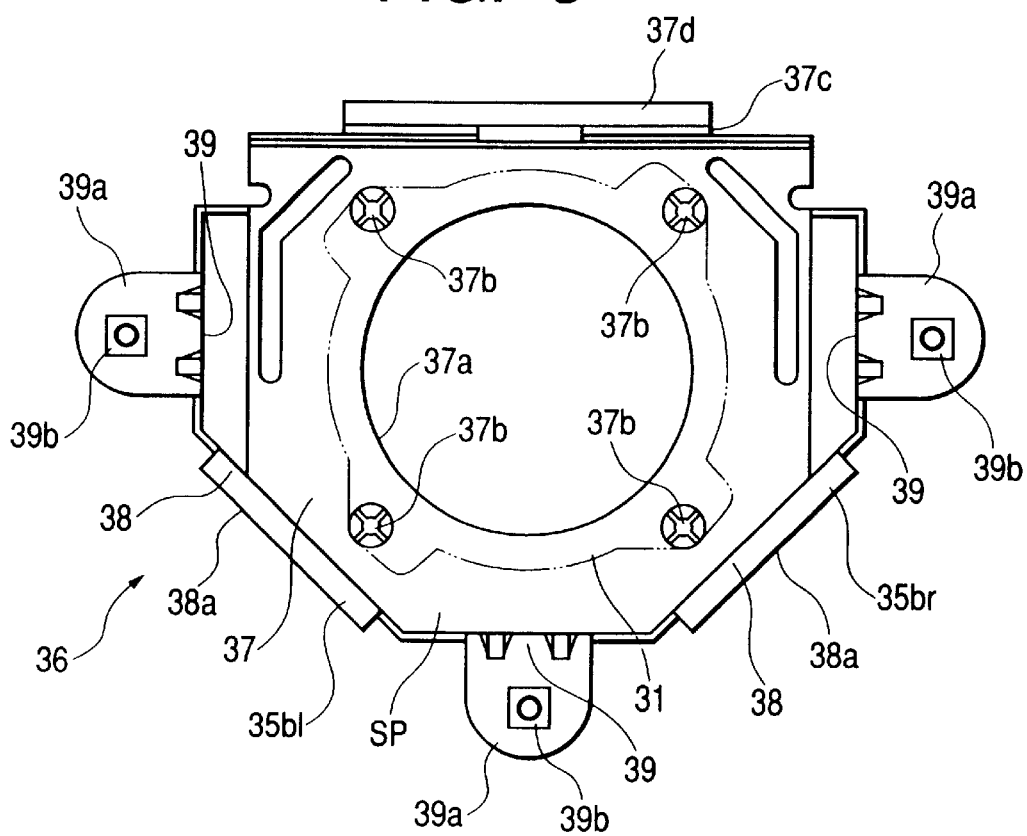
FIG. 5 shows a plan view of a bag holder of the air bag system according to the embodiment of the invention.

As shown by a chain double-dashed line of FIG. 5, the retainer 31 is made from substantially square annular sheet metal and has the bolt 31a projecting downward in four corner places as shown in FIG. 4. The retainer 31 is used to fit the air bag 11 in the bag holder 36 of the casing 35 by holding down the peripheral edge of the opening 13, which will be described later, of the air bag 11.

The casing 35 includes the bag holder 36 made from sheet metal, and the plastic pad 40 as the air bag cover.

The bag holder 36 is formed as shown in FIGS. 1–5 with a substantially triangular platelike base wall portion 37 with the three cutout corners, and side wall portions 38 and 39 extending upward from the respective outer peripheral edges of the base wall portion 37. In the base wall portion 37 exists a through-hole 37a formed in the center thereof for receiving the inflator body 33a from below, and four through-holes 37b formed around the through-hole 37a for use in passing the respective bolts 31a of the retainer 31. On the front edge side of the base wall portion 37 exists as shown in FIGS. 3 and 5 a coupling portion 37c extending downward and reversing upward. At the front end of the coupling portion 37c also exists a retaining pawl 37d reversing downward. The coupling portion 37c is used to retaining the retaining pawl 37d of a retaining groove 45a in the side wall portion 45 of the pad 40 and also to rivet the side wall portion 45 with rivets 48.

The two side wall portions 38 of the bag holder 36 are laterally disposed as shown in FIGS. 4 and 5 and respectively extended upward from the base wall portion 37, a retaining pawl 38a extending downward being provided to the each front end of the base wall portion 37. Each side wall portion 38 is used to retain the retaining pawl 38a of retaining groove 46a in the side wall and also to rivet the side wall portion 46 with the rivet 48.

As shown in FIGS. 1–4, the side wall portion 39 of the bag holder 36 is extended upward from the proximity of each of the spokes SL, SR and SB of the base wall portion 37, a fitting portion 39a extending outward being provided on the upper end of the side wall portion 39 thereof. Each of the fitting portions 39a has the nut 39b secured thereto and is coupled to and supported by the support portion 7e of the support plate 7 with the horn switch mechanism 9 held therebetween by the fluted bolt 9d of the horn switch mechanism 9 screwed into the nut 39b.

As shown in FIGS. 1–4, the pad 40 is formed with a cover body portion 41 covering the upper portion of the boss portion B, and the side wall portions 45 and 46 projecting downward from the underside of the cover body portion 41. The cover body portion 41 includes two door portions 42 and 42 in the region surrounded with the side wall portions 45 and 46. The door portions 42 and 42 are opened when the air bag 11 is inflated and includes a thin-walled portion 43 to be ruptured around them. The rupture portion 43 is substantially H-shaped as viewed from the top of the pad 40, so that the door portions 42 and 42 are separated in the cross direction in the H-shaped cross bar region. The longitudinal door portions 42 and 42 are such that their rupture portion 43 is ruptured when the air bag 11 is inflated and as shown by a chain dashed-line of FIG. 3, they are opened in the cross direction like a hinged double door. Moreover, a press rib 44 coming into contact with each fitting portion 39a of the bag holder 36 is formed on the underside of the cover body portion 41.

The platelike side wall portion 45 of the pad 40 is extended downward from the front edge side of the cover body portion 41 and includes the retaining groove 45a for retaining the retaining pawl 37d of the bag holder 36 on its inner side and a plurality of fitting holes (not shown) in position for receiving the rivets 48 therethrough.

The platelike side wall portion 46 of the pad 40 is extended downward from the left and right sides of the cover body portion 41, each including the retaining groove 46a for retaining the retaining pawl 38a of the bag holder 36 and a plurality of fitting holes 46b in position for receiving the rivets 48 therethrough.

The underside of the folded air bag 11 according to this embodiment of the invention is regulated by the base wall portion 37 of the bag holder 36 and the body 33a of the inflator 33, whereas its surface side is regulated by door portions 42 and 42 of the pad 40, the outer peripheral side face being regulated by the side wall portions 45 and 46 of the pad 40 and the side wall portions 38 and 39 of the bag holder 36.

According to this embodiment of the invention, the steering wheel W1 is of the three-spoke type. In order to improve the external design of the boss portion B and meter visibility, the pad 40 covering the upper portion of the boss portion B has a smaller planar shape. On the respective lateral sides of the rear edges 40bl and 40br, the pad 40 is set diagonal, substantially linear and closer to the center of the boss portion B. Consequently,in the casing 35 of the air bag system M installed in the boss portion B, the lateral rear edge regions 35bl and 35br formed with the pad side wall portion 46 and the bag holder side wall portion 38 are set closer to the proximity of the center of the boss portion B to make compact the regions by reducing the housing space SP therein.

As shown in FIGS. 1–3 and 6, the air bag 11 is bag-like and has the opening 13 for introducing the inflation gas therethrough to make the expanded cross section a substantially elliptic sphere. According to this embodiment of the invention, the air bag 11 is a planar air bag comprising two sheets of cloth prepared by cutting fabric woven of such as polyamide or polyester thread into a circular shape. The peripheral wall portion forming the bag-like air bag 11 comprises the base wall portion 12 forming the peripheral edge of the opening 13 made of cloth on one side, and a top wall portion 16 forming a side opposite to the opening 13 and made of cloth on the other side.

The opening 13 for introducing the inflation gas is formed in the center of the base wall portion 12, and four fitting holes 14 for receiving the respective bolts 31a of the retainer 31 are formed in the peripheral edge of the opening 13. Two vent holes 15 for discharging the excessive inflation gas are formed in the front edge of the base wall portion 12. The opening 13 is substantially equal in inner diameter to the through-hole 37a of the retainer 31 or the base wall portion 37 of the bag holder, so that the body 33a of the inflator 33 is insertable from below.

In order to produce the air bag 11, woven fabric is cut into a predetermined circular shape, and the predetermined holes 13, 14 and 15 are formed to provide the base and top wall portions 12 and 16. Then regions for forming the outer peripherals face sides of the air bag 11 are made to abut against each other and the outer peripheral edges are sewn together. Further, the opening 13 is utilized for turning over a margin to sew up to prevent the margin from being exposed to the outer peripheral side.

When the holes 13, 14 and 15 of the base wall portion 12 are formed, reinforcing cloth (not shown) is sewn onto the peripheral edges of these holes 13, 14 and 15 so as to bore them.

The air bag 11 thus produced is folded up and housed in the casing 35 to assembly the air bag system M.

Figure 7A:
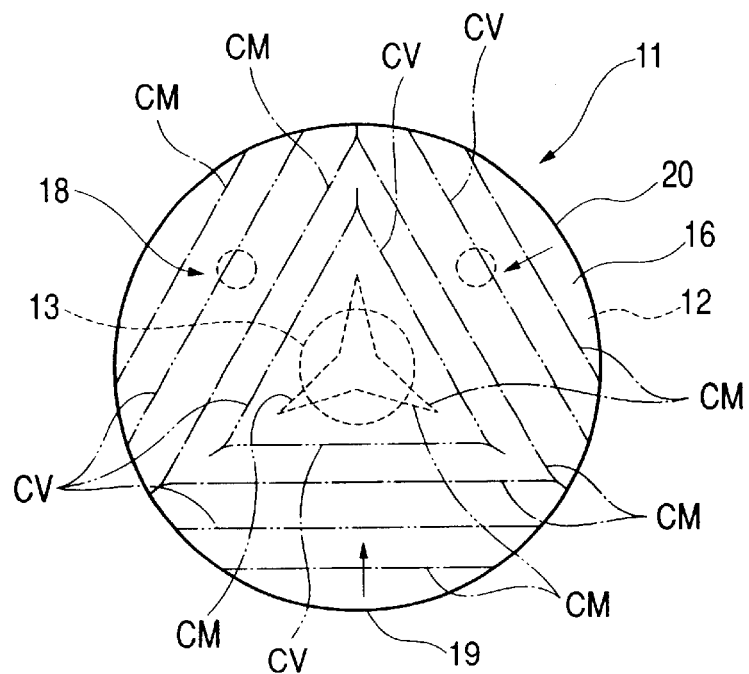
FIGS. 7A to 7C show diagram explanatory of the folding of the air bag according to the embodiment of the invention.

When the air bag 11 is folded up, the top wall portion 16 on the opposite side of the opening 13 is put on the side of the base wall portion 12 having the opening 13 and flatly developed to fold the air bag 11 twice as shown in FIG. 7A.

Figure 7B:
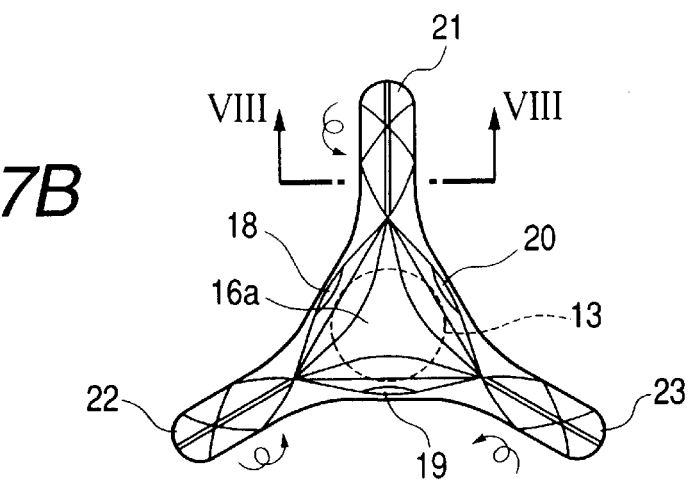
Figure 8:
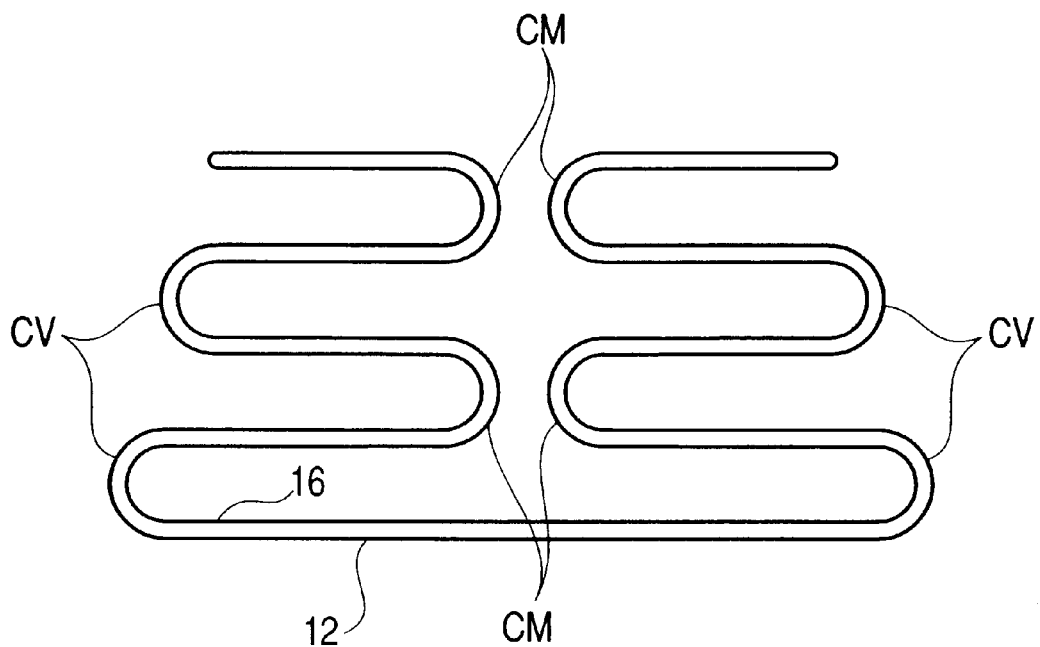
FIG. 8 shows a schematic sectional view of the folded air bag taken on region VIII—VIII at the first stage according to the embodiment of the invention.

As shown in FIGS. 7A, 7B and 8, peripheral edges 18, 19 and 20 in three directions radially and uniformly divided are folded around the opening 13 at the first stage in such a way as to set the peripheral edges closer to the opening 13. According to this embodiment of the invention, the peripheral edges 18, 19 and 20 are folded by adding crest creases CM and valley creases CV under the bellows folding method on the side of the top wall portion 16 opposite to the opening 13.

Figure 7C:
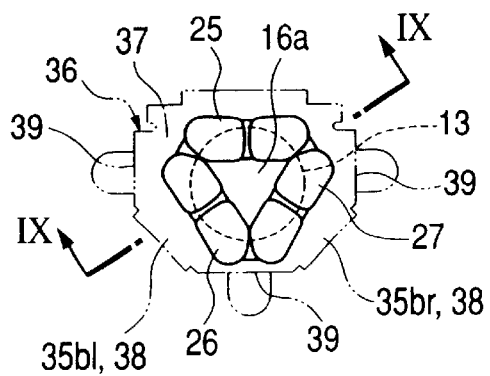
Figure 9:
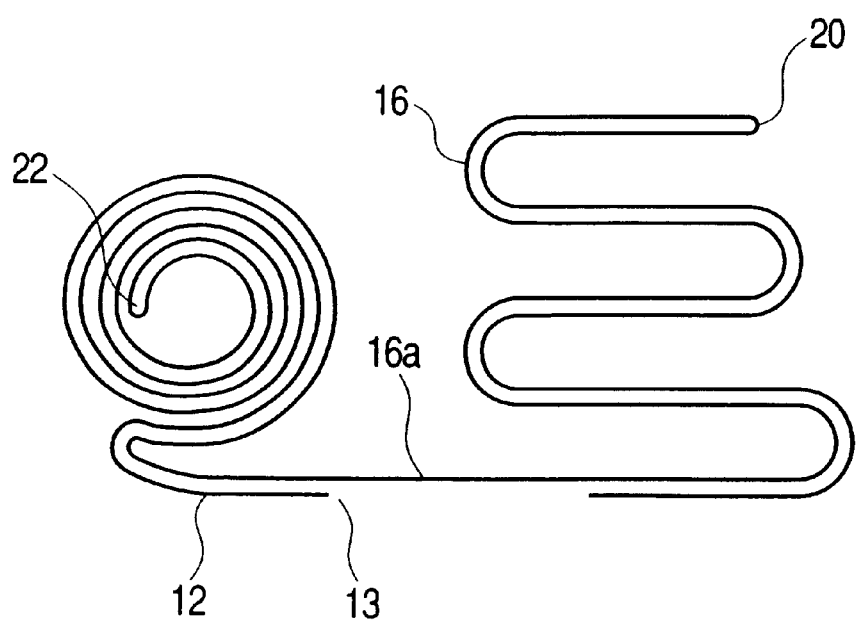
FIG. 9 shows a schematic sectional view of the folded air bag taken on region IX—IX at the second stage according to the embodiment of the invention.

As shown in FIGS. 7B, 7C and 9, peripheral edges 21, 22 and 23 on the end portion side folded in the three directions around the opening 13 are folded at the second stage in such a way as to set the peripheral edges closer to the opening 13 whereby to complete the work of folding the air bag 11. According to this embodiment of the invention, the peripheral edges 21, 22 and 23 on the end portion side folded at the first stage are folded under the outer roll folding method; in other words, the peripheral edges 21, 22 and 23 are wound on the side of base wall portion 12 having the opening 13 and then folded so that they may be mounted on the side of the top wall portion 16 opposite to the opening 13.

In this case, the retainer 31 is inserted into the air bag 11 before the air bag 11 is folded and while each bolt 31a of the retainer 31 is projected from the fitting hole 14, the folding work at the first and second stages is done.

After the work of folding the air bag 11 is completed, the air bag 11 may be wrapped with a thin breakable wrapping bag to prevent the folds from being canceled.

Housing the folded air bag 11 in the casing 35 will be described next. First,the bolt 31a of the retainer 31 projecting from the folded air bag 11 are passed through the respective through-hole 37b of the base wall portion 37 of the bag holder and then the air bag 11 is mounted on the base wall portion 37 surrounded with the side wall portions 38 and 39 (see FIG. 7C).

At this time, the air bag 11 is mounted on the base wall portion 37 so that only one pack 25 out of the three packs (folded regions) 25, 26 and 27 formed by folding the air bag 11 at the second stage may be disposed on the front edge side of the base wall portion 37. Incidentally, the vent holes 15 and 15 are arranged in the region where the pack 25 is formed.

Subsequently, the body 33a of the inflator 33 is inserted into the through-hole 37a of the base wall portion 37 of bag holder from below and the bolts 31a of the retainer 31 are inserted into the respective through-holes 33d to abut the flange portion 33c of the inflator 33 against the underside of the base wall portion 37. Then the bolt 31a projecting from the flange 33c is screwed into the nut 32 so as to integrally assemble the air bag 11, the bag holder 39 and the inflator 33. This assembly work may be done after the air bag 11 is coupled to the bag holder 39 of the pad 40. As the upper portion of the inflator body 33a is inserted into the air bag 11 through the opening 13 during the assembly work, the folded air bag 11 is in such a state that parts of the packs 25, 26 and 27 are mounted on the surface of the inflator body 33a and as shown in FIG. 1 are forced to widen over the whole area of the surface of the base wall portion 37 of the bag holder.

Then the pad 40 is forced down from above so as to surround the outer peripheral face of the side of the folded air bag 11 with the side wall portions 45, 46 and 46, and the retaining grooves 45a, 46a and 46a are caused to be retained by the respective pawls 37d and 38a. Further, the side wall portions 45, 46 and 46 of the pad 40 are coupled to the coupling portion 37c and the side wall portions 38 and 38 of the bag holder 36 with the rivets 48, whereby assembling the casing 35 and the air bag system M is completed.

Further, mounting the air bag system M in a vehicle will be described. First, the horn switch mechanism 9 is installed above each support portion 7e of the support plate 7, and the region of the horn switch mechanism 9 is disposed on the underside of each fitting portion 39a of the bag holder 36. Then each fluted bolt 9d is screwed into the nut 39b from below of each support portion 7e in order to form an air bag system assembly comprising the air bag system M, horn switch mechanisms 9 and the support plate 7.

While the core bar 2 of the boss portion B of the steering wheel body 1 is clamped to the steering shaft (not shown) of a vehicle, the air bag system assembly is set from above and the core bar 2 of the spoke SL and SR is fixed to each fitting pieces 7b of the support plate 7 with the bolts 8. The assembly of the steering wheel W1 is thus completed and the air bag system M can be mounted in the vehicle.

When the inflation gas is discharged from the gas discharge port 33b of the inflator 33 after the air bag system M is mounted in the vehicle, the inflation gas is caused to flow in from the opening 13 and the air bag 11 breaks the rupture portion 43 of the pad cover body portion 41. Then the door portions 42 and 42 are opened as shown by the chain double-dashed lines of FIG. 3, so that the air bag 11 is protruded from the pad 40 and developed greatly before being inflated.

In the air bag 11 according to the embodiment of the invention, at the first stage where the air bag 11 is flatly developed, the peripheral edges 18, 19 and 20 in the three directions around the opening 13 are folded around the opening 13 in such a way as to set the peripheral edges closer to the opening 13. At the second stage, the peripheral edges 21, 22 and 23 on the end portion side folded in the three directions around the opening 13 are folded in such a way as to set the peripheral edges closer to the opening 13. Thus, the air bag 11 flatly developed is ultimately folded into the three packs 25, 26 and 27.

In other words, since the air bag 11 according to this embodiment of the invention is folded into the three packs 25, 26 and 27, the thickness and shape in top view of one pack can be reduced as compared with the conventional case where the air bag is folded into two packs, so that the thickness of the completely folded air bag 11 is also reducible; that is, even though parts of the folded packs 25, 26 and 27 are mounted on the surface of the body 33a of the inflator 33 according to this embodiment of the invention, the thickness of the air bag 11 is still reducible.

Moreover, these three packs 25, 26 and 27 that are ultimately folded up are easy to dispose radially and as each of the folded packs 25, 26 and 27 is smaller in shape in top view than the conventionally folded one, the shape of the completely folded Therefore, the air bag 11 in the air bag system M according to this embodiment of the invention can easily be housed in a compact casing.

According to this embodiment of the invention, the folding at the second stage is carried out under the outer roll folding method. More specifically, the central region 16a of the top wall portion 16 opposite to the opening 13 attempts to protrude during the initial period of the air bag 11 while canceling the folding of the three packs (folded regions) 25, 26 and 27 covering the surrounding. However, due to the fact that each of the packs 25, 26 and 27 is wound on the side of the base wall portion 12 having the opening 13, the winding of these packs is difficult to cancel in comparison with the bellows and inner roll folding method (for winding the folded end portion on the peripheral wall portion side opposite to the opening). Consequently, it is possible to suppress the protrusion of the central region 16 of the top wall portion opposite to the opening 13.

When the folding of the three packs 25, 26 and 27 is canceled, the inflation gas is finely dispersed in the three directions of the three packs 25, 26 and 27. Accordingly, the flow rate of the inflation gas for canceling the folding of each of the packs 25, 26 and 27, and the rate of canceling the folding of each of the packs 25, 26 and 27 is suppressed, so that the central region 16a of the top wall portion opposite to the opening 13 is further restrained from protruding.

Therefore, even though the air bag 11 attempts to interfere with the driver during the initial period of inflation of the air bag 11, the pressure of the air bag 11 applied to the driver can be lowered.

Figure 12:
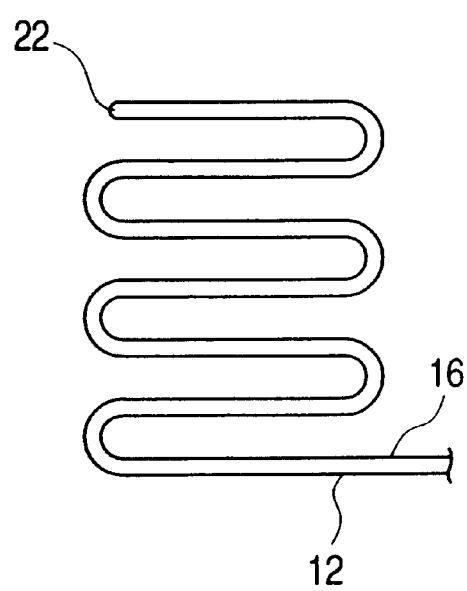
FIG. 12 shows a schematic sectional view of a modified example of the air bag folded at the second stage.

Without taking that point into consideration, the peripheral edges 21, 22 and 23 may be subjected to bellows folding at the second stage of folding as shown in FIG. 12. Further, the inner roll folding method for winding the peripheral edges 21, 22 and 23 on the side of top wall portion 16 may also be employed in this case.

Figure 11:
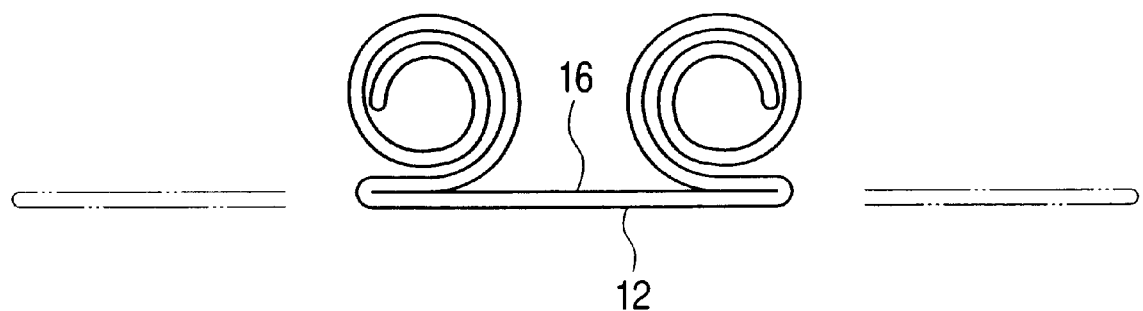
FIG. 11 shows a schematic sectional view of a modified example of an air bag to be folded at the first stage.

According to this embodiment of the invention, the bellows folding method is employed at the first stage of folding. In other words, the creases CM and CV are successively added from the peripheral edge sides 18, 19 and 20 in order to facilitate the folding operation in comparison with the outer roll and inner roll folding methods. Without taking this point into consideration, the peripheral edges 18, 19 and 20 may be subjected to outer or inner roll folding as shown in FIG. 11.

Figure 10:
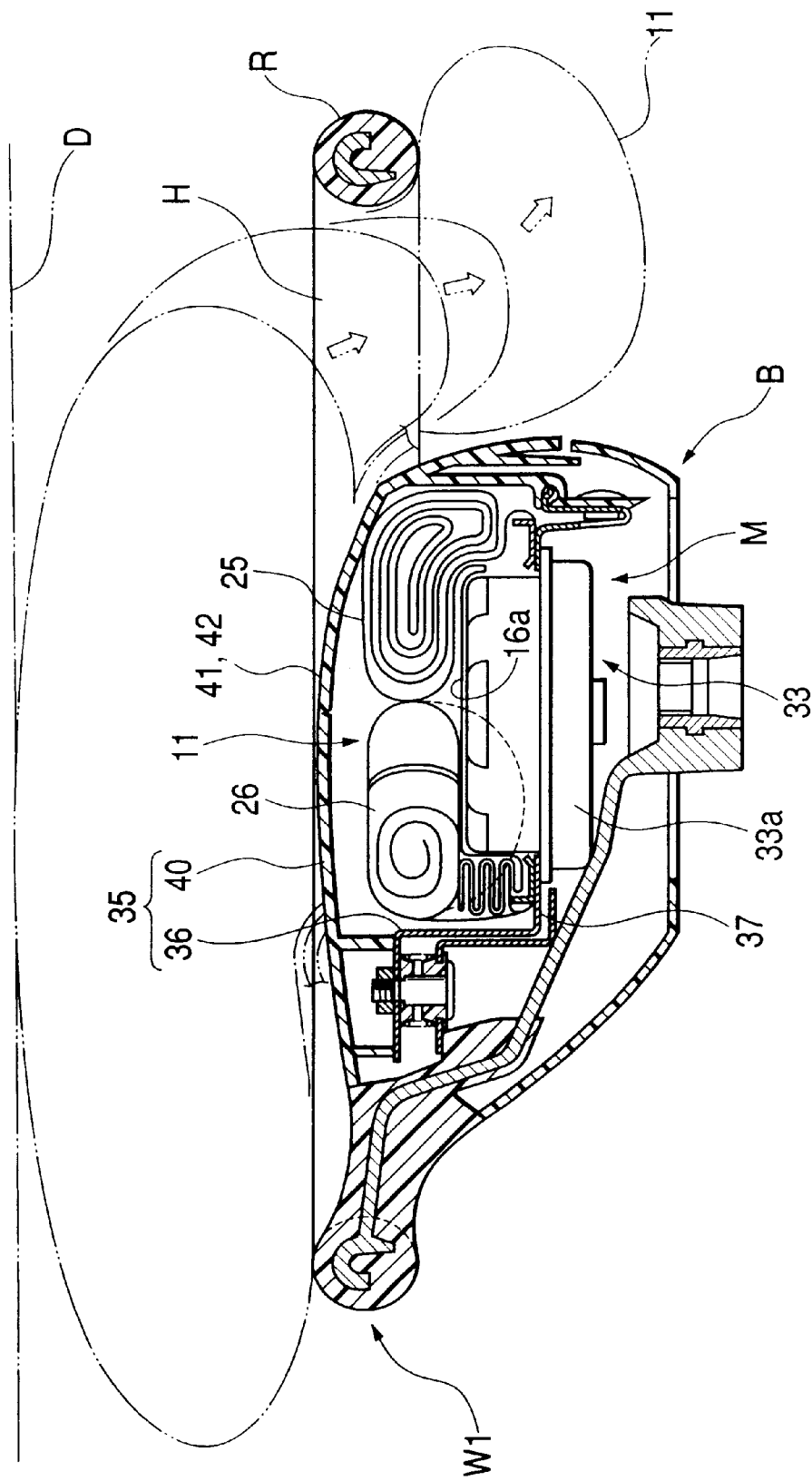
FIG. 10 shows a diagram explanatory of the inflation of the air bag while a driver is situated extremely close to a steering wheel according to the embodiment of the invention.

According to this embodiment of the invention, the outer roll folding method is employed at the second stage and the casing 35 including the bag holder 36 and the pad 40 is disposed in the boss portion B of the steering wheel W1 having the space H with respect to the ring portion R on the front side of the casing 35. Consequently, the air bag 11 operates to protrude its region 16a opposite to the opening 13 while canceling the folding of the three packs 25, 26 and 27 in the folded region. However, as the three packs 25, 26 and 27 in the folded region are wound on the side of the peripheral wall portion 12 having the opening 13, their winding is released in a manner extending outward in order to move the driver D without interfering with the driver D when it interferes with the driver D situated extremely closer to the steering wheel W1 as shown in FIG. 10. When the air bag 11 interferes with the ring portion R, it releases the winding of the packs 25, 26 and 27 so as to move under the ring portion R. Consequently,the presence of the large space H between the front side of the boss portion B and the ring portion R allows the air bag 11 to enter the lower side of the ring portion R via the space H, thus suppressing the projection of the air bag 11 toward the driver D. Needless to say, the region 16a opposite to the opening 13 is restrained from protruding because of the outer roll folding at the second stage and set the air bag 11 free from interfering with the driver while moving the driver away, whereby the packs 25, 26 and 27 (the pack 25 according to this embodiment of the invention) in the folding region smoothly enter the lower side of the ring portion R while releasing their winding.

Therefore, as shown by chain lines, chain double-dashed lines, chain triple-dashed lines and chain quadri-dashed lines of FIG. 10 according to this embodiment of the invention, even though the air bag 11 interferes with the driver D situated extremely closer to the steering wheel W1, the air bag 11 is allowed to escape into the space H between the front portion side of the boss portion B and the ring portion R, the pressure of the air bag 11 applied to the driver D can be lowered.

A large space H for increasing meter visibility is provided between the front portion side of the boss portion and the ring portion, the space H occupying substantially the first half the steering wheel. When the air bag 11 is ultimately folded into the three packs 25, 26 and 27 in the folded region according to the invention, while at least one pack 25 out of the three packs 25, 26 and 27 in the folded region or the folded region according to this embodiment of the invention is 180° turned, the two packs are disposed on the side of the space H whereby to house the air bag 11 in the casing 35 of the boss portion B. In other words, when the air bag 11 is ultimately folded into the three packs 25, 26 and 27 in the folded region according to the invention, at least one pack in the folded region can be disposed on the side of the space H in front of the boss portion even though the orientation of the folded regions 25, 26 and 27 is varied with the center of the steering wheel W1 as a reference. Accordingly, part of the air bag 11 is easily made to enter the lower side of the front portion side of the ring portion R even when the steering wheel W1 interferes with the driver D situated extremely closer to the steering wheel W1 without taking the orientation of the folded regions 25, 26 and 27 into consideration. Therefore, the pressure of the air bag 11 applied to the driver D can be lowered.

Further, only one pack 25 out of the folded regions (packs) 25, 26 and 27 formed at the second stage according to this embodiment of the invention is housed in the casing 35 in such a way that it is disposed on the front side of the three-spoke type steering wheel W1.

Consequently, the two folded packs 26 and 27 other than the folded pack 25 disposed on the front side of the steering wheel W1 are respectively disposed in the left- and right-hand diagonal rear of the boss portion B of the steering wheel W1 in top view, so that the small folded packs 26 and 27 are disposed laterally and uniformly. Further, together with the small folded packs 25, 26 and 27, the folded air bag 11 is easily housed in the compact casing 35 having a small housing space SP in the lateral rear edges of the boss portion B of the three-spoke type steering wheel W1.

Figure 13:
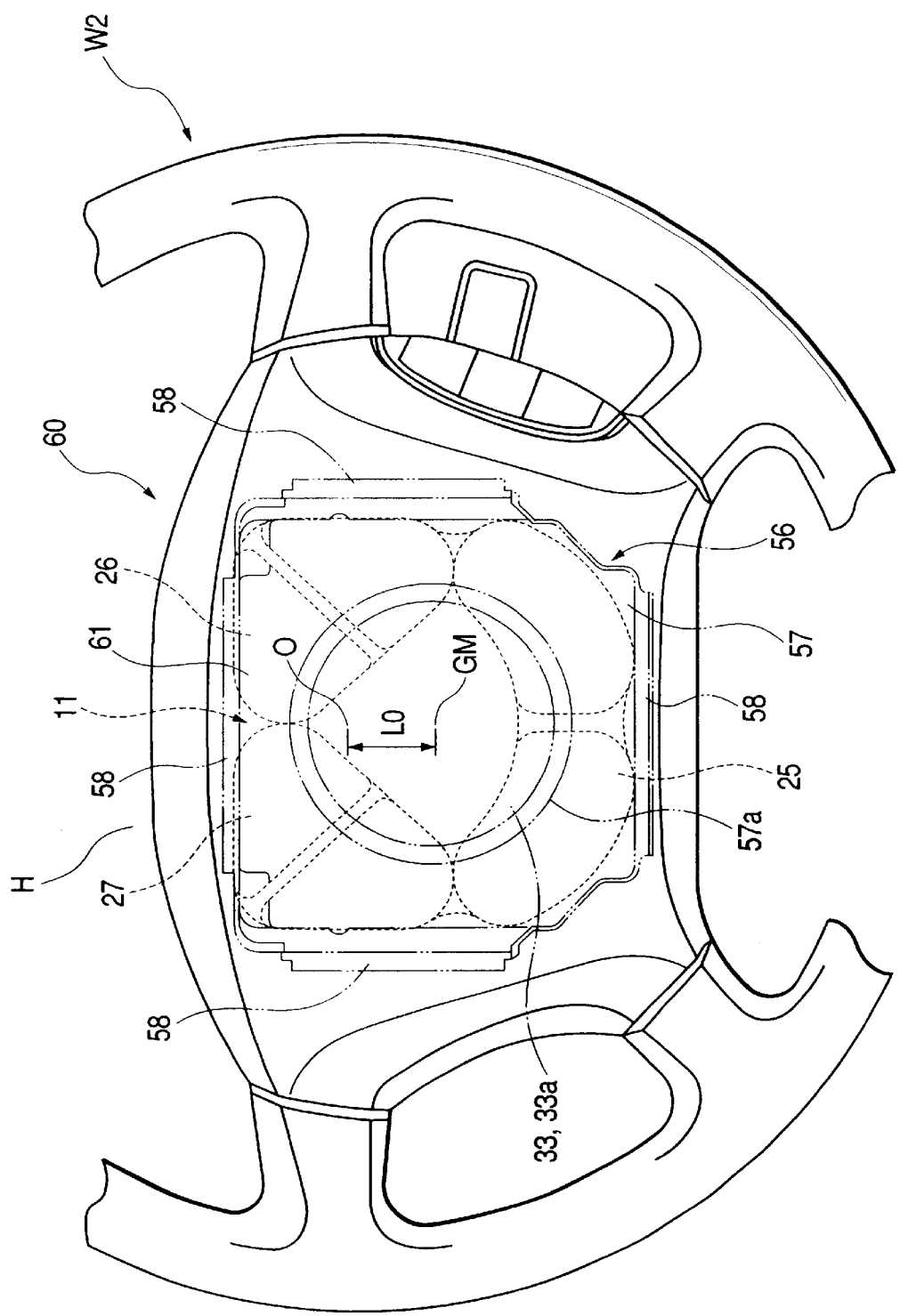
FIG. 13 shows a plan view of a steering wheel when the air bag is installed in a four-spoke type steering wheel according to the embodiment of the invention.

Without taking that point into consideration, the folded packs 26 and 27 formed at the second stage may be housed in a casing 55 so that they are disposed on the front side of a four-spoke type steering wheel W2 in FIG. 13. In this case, the bellows folding method is employed for folding the air bag 11 at the first stage while the creases CM and CV shown in FIG. 7A are stopped in their positions in such a state that the air bag 11 itself is 180° turned around the opening 13. Accordingly, the folded packs 26 and 27 formed at the second stage are respectively provided with bent holes 15.

The casing 55 for used in the steering wheel W2 includes a bag holder 56 made from square boxlike sheet metal, and a pad 60 as an air bag cover. The underside of the folded air bag 11 is regulated by the substantially square platelike base wall portion 57 of the bag holder 56, and an inflator body 33a projecting upward from the through-hole 57a of the base wall portion 57; the surface side thereof is regulated by a door portion 62 (see FIG. 16) opening when the air bag is inflated in the cover body portion 61 of the pad 60; and the outer side peripheral face thereof is regulated by a side wall portion 58 extending upward in a substantially square cylindrical shape from the peripheral edge of the base wall portion 57 of the bag holder, and a side wall portion (see FIG. 16) in the substantially square cylindrical shape of the pad 60 coupled to the side wall portion 58. The side wall portions 58 and 65 are mutually coupled when the retaining groove 65 provided on the inner peripheral face side of the side wall portion 65 is retained by the retaining pawl 58a provided at the upper end of the side wall portion 58 (see FIG. 16).

The steering wheel W2 can also achieve similar effect like the steering wheel W1.

Figure 14:
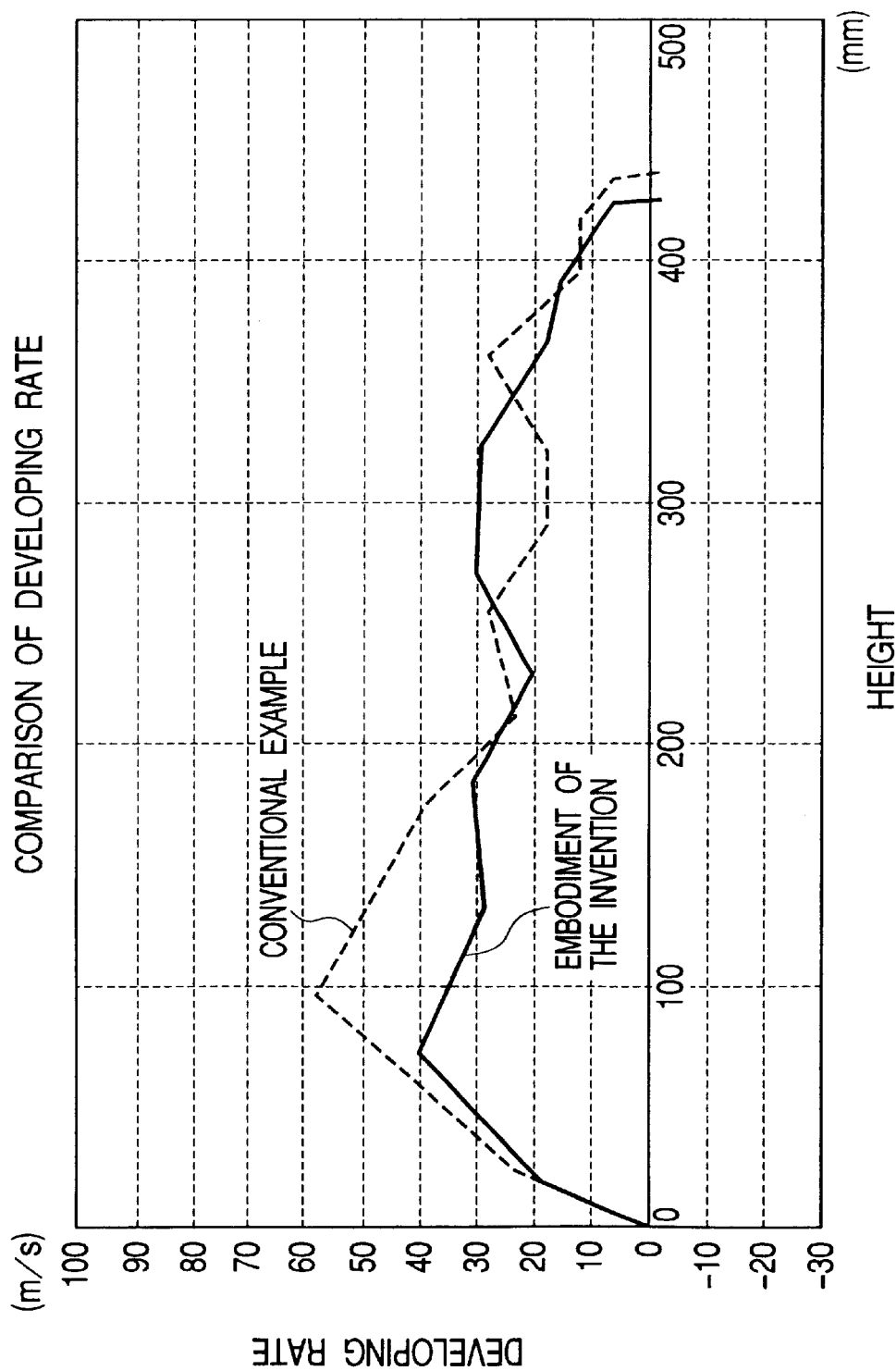
FIG. 14 shows a graph showing the comparison in the rate of developing an air bag and projection height between the four-spoke type steering wheel using the air bag according to this embodiment of the invention and a conventional air bag.

FIG. 14 is a graph showing the comparison in the rate of developing an air bag and projection height between the four-spoke type steering wheel W2 (according to this embodiment of the invention) and the conventional four-type steering wheel (wherein the folded region of the air bag is disposed on both lateral sides of the inflator as described in JP-A-10-175494). The comparison tests were made between the embodiment of the invention and the conventional example in such a condition that the air bag configuration, output of the inflator, rupture strength of the pad cover body portion and like were set equal except that the methods of folding the air bags and housing the air bags were left different.

As is obvious from the graph, the development rate was seen to be less partially variable, uniformly suppressed and stabilized in the air bag 11 of the steering wheel W2 in comparison with the conventional example.

Figure 15:
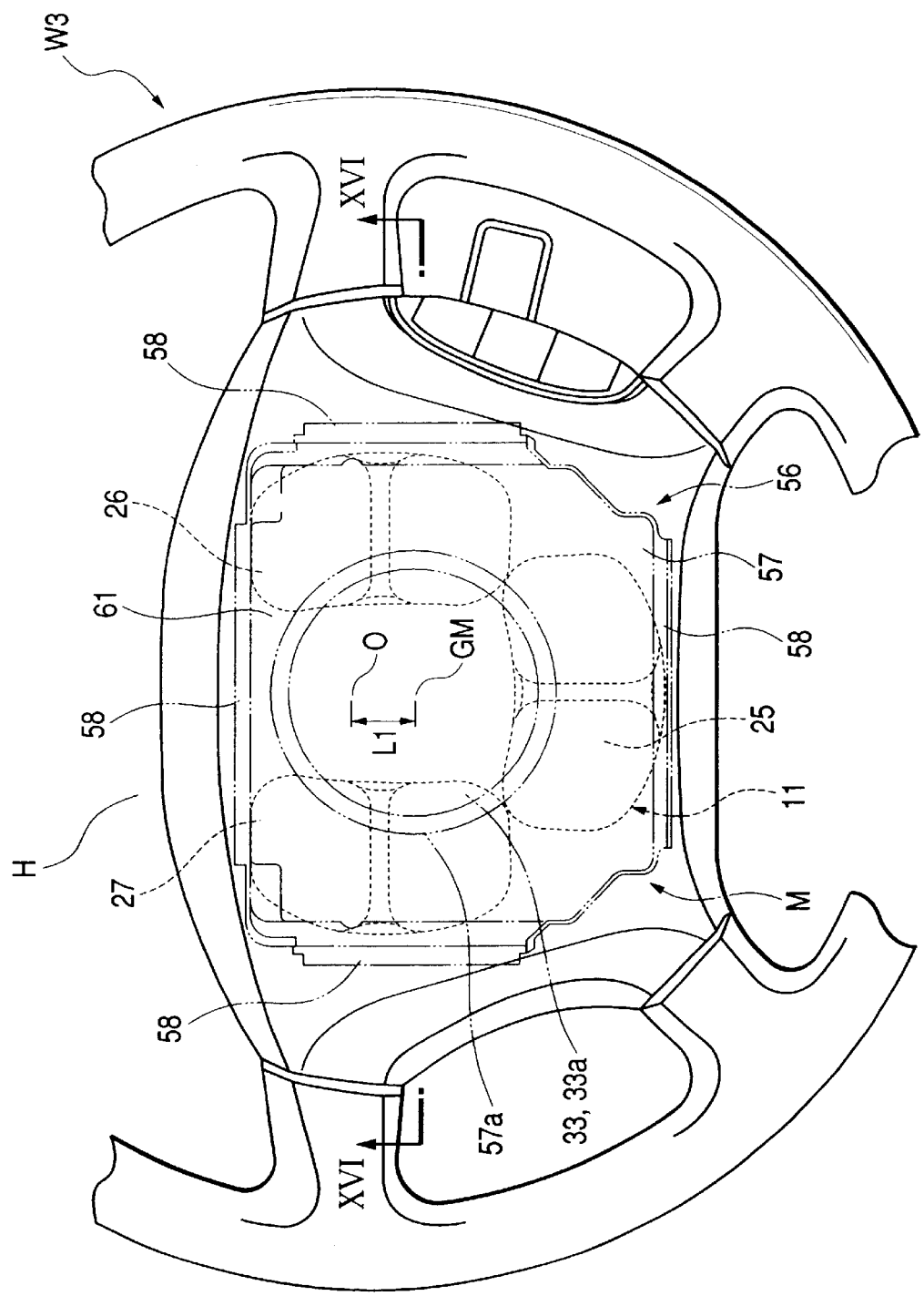
FIG. 15 shows a plan view of a steering wheel when the air bag is installed in another four-spoke type steering wheel according to the embodiment of the invention.
Figure 16:
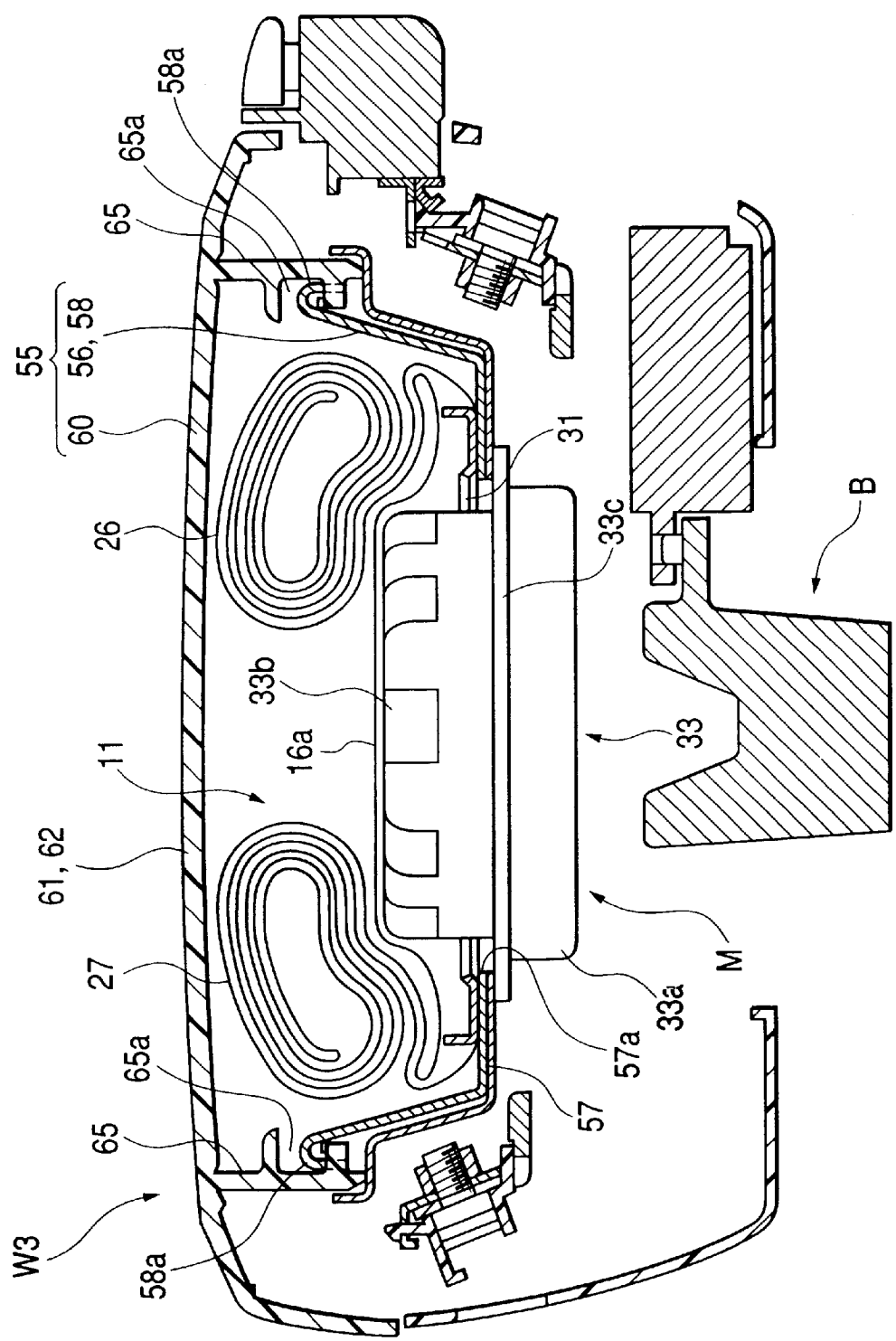
FIG. 16 shows a schematic sectional view taken on region XVI—XVI of FIG. 15.

As in a steering wheel W3 shown in FIGS. 15 and 16, the three packs 25, 26 and 27 in the folded region of the air bag 11 may be arranged so that only one pack 25 formed in the folded region formed at the second stage is disposed on the rear side of the inflator body 33a, whereas the remaining two packs 26 and 27 formed in the folded region formed at the first stage are respectively disposed on the lateral sides of the inflator body 33a. With this arrangement, the inflator 11 heavier than the pack 25 of the air bag 11 is easily disposed on the front side of bag holder 56 in the casing 55 and by disposing the heavy inflator 11 on the front side of the casing 55, the center of gravity GM of the air bag system M can easily be set closer to the center of rotation 0 during the operation of the front-side steering wheel W3. Consequently, the distance L1 between the center of gravity GM and the center of rotation 0 is shortened, whereby the center of gravity balance during the operation of the steering wheel W3 becomes improvable.

When the air bag system is installed in the boss portion of the steering wheel, there has been provided the large space H between the front portion side of the boss portion B and the ring portion R in order to improve meter visibility. The center of gravity GM of the air bag system M is as shown in FIG. 13 positioned rearside farther than the center of rotation 0 during the operation of the steering wheel W2, whereas the distance LO between the center of gravity GM and the center of rotation O is increased.

In the steering wheels W1, W2 and W3, further, the bag holders 36 and 56 of the casing 35 and 55 dispose the inflator 33 for generating the inflation gas in the base wall portions 37 and 57. Part of the folded regions 25, 26 and 27 formed at the second stage are mounted on the surface of the inflator body 33a and housed in the casings 35 and 55. However, since the three packs 25, 26 and 27 are ultimately folded in the second stage according to this embodiment of the invention, the thickness of one pack and its shape in top view can be reduced in comparison with the conventional case where two packs are folded up. Thus, the thickness of the completed folded air bag is also reducible to make the air bag system M thinner even though part of the folded regions 25, 26 and 27 are mounted on the surface of the inflator body 33a. Since part of the folded regions 25, 26 and 27 are mounted on the surface of the inflator body 33a, the shape of the completely folded air bag 11 is reducible in top view. Consequently, the air bag 11 can be housed in more compact casings 35 and 55. Needless to say, the working effect like this is made achievable by mounting part of at least one of the folded regions 25, 26 and 27 on the surface of the inflator body 33a.

While the folded regions 25, 26 and 27 are not mounted on the surface of the inflator body 33a as much as possible, the air bag 11 may be housed in casings 35 and 55. In this case, the thickness of the air bag including the inflator is reducible further though the shape of the folded air bag 11 in top view is increased.

Further, the folded air bag 11 may be used in not only three- and four-spoke type steering wheels W1, W2 and W3 but also two-spoke type steering wheel.

Although the air bag 11 of the air bag system M installed in the steering wheels W1, W2 and W3 according to the embodiment of the invention has been described, this invention is applicable to any air bag system including what is intended for a passenger in front of a passenger seat and for side collision on the side seat on condition that the peripheral wall portion on a side opposite to an opening for introducing an inflation gas is put on the side of the peripheral wall portion having the opening in such a manner as to set flatly developed peripheral edges closer to the opening side before being folded twice whereby to house the air bag in the casing.

Figure 17:
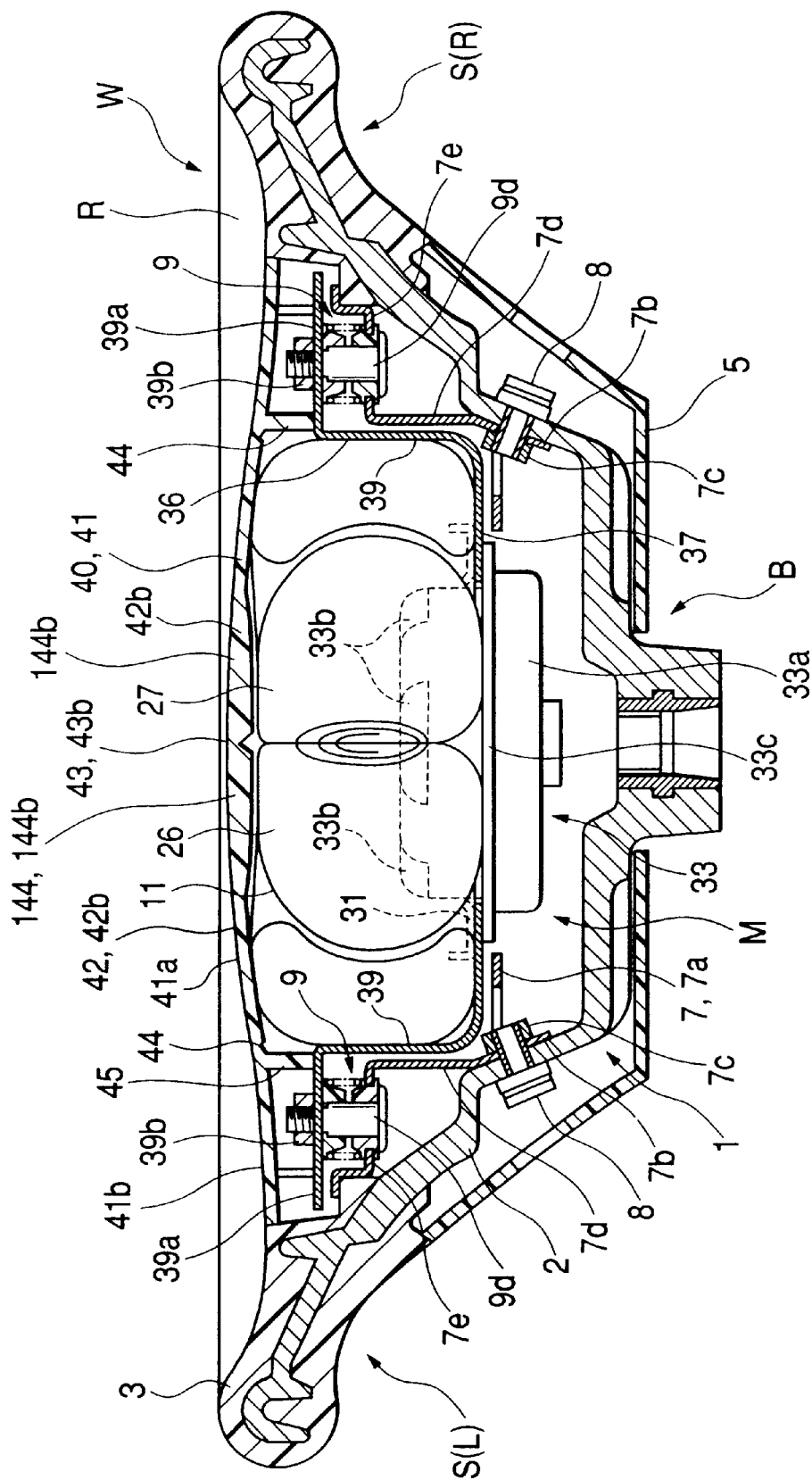
FIG. 17 shows a schematic section view of the air bag system according to another embodiment of the invention.
Figure 18:
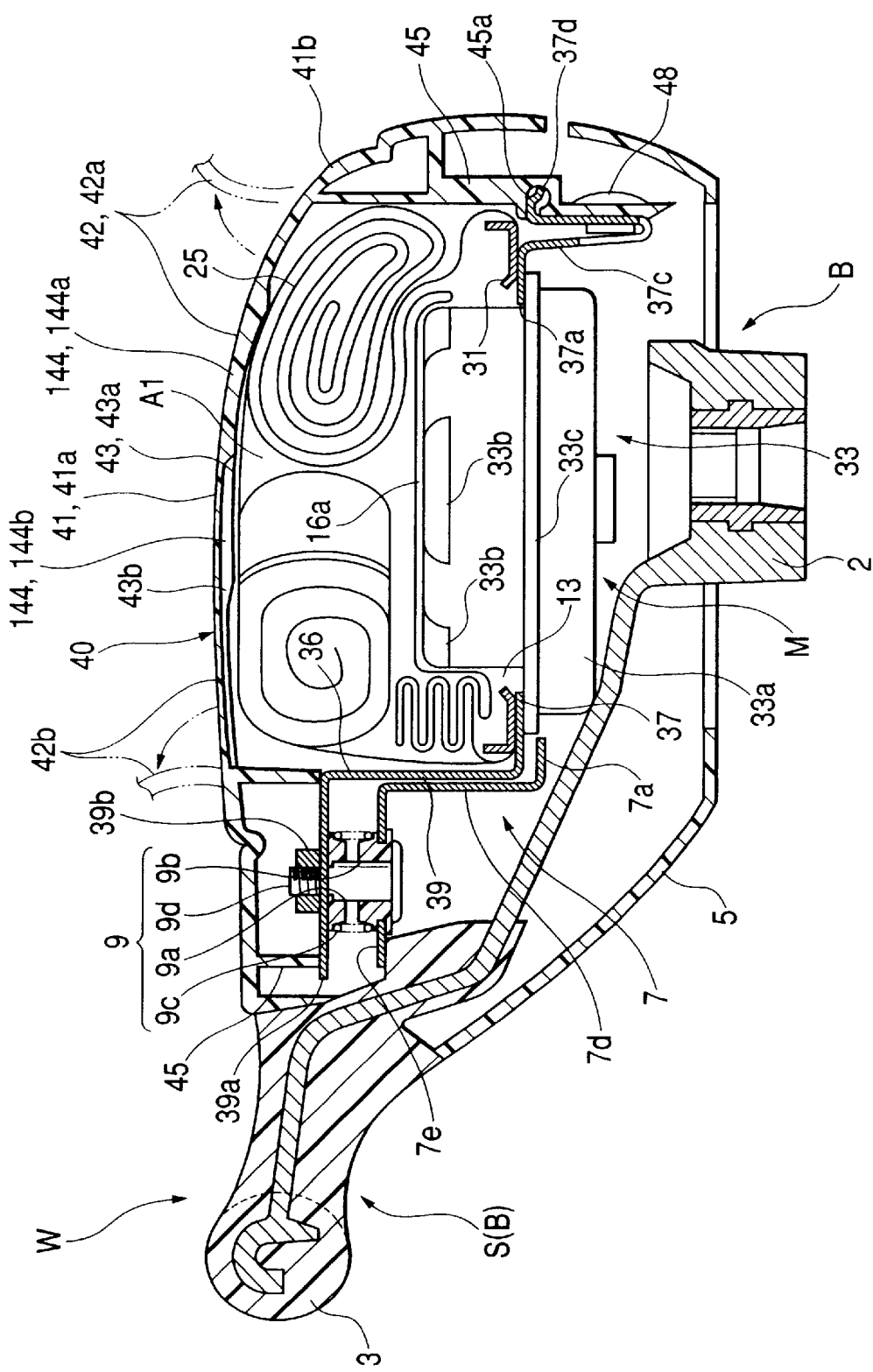
FIG. 18 shows a schematic section view of the air bag system according to another embodiment of the invention.
Figure 19:
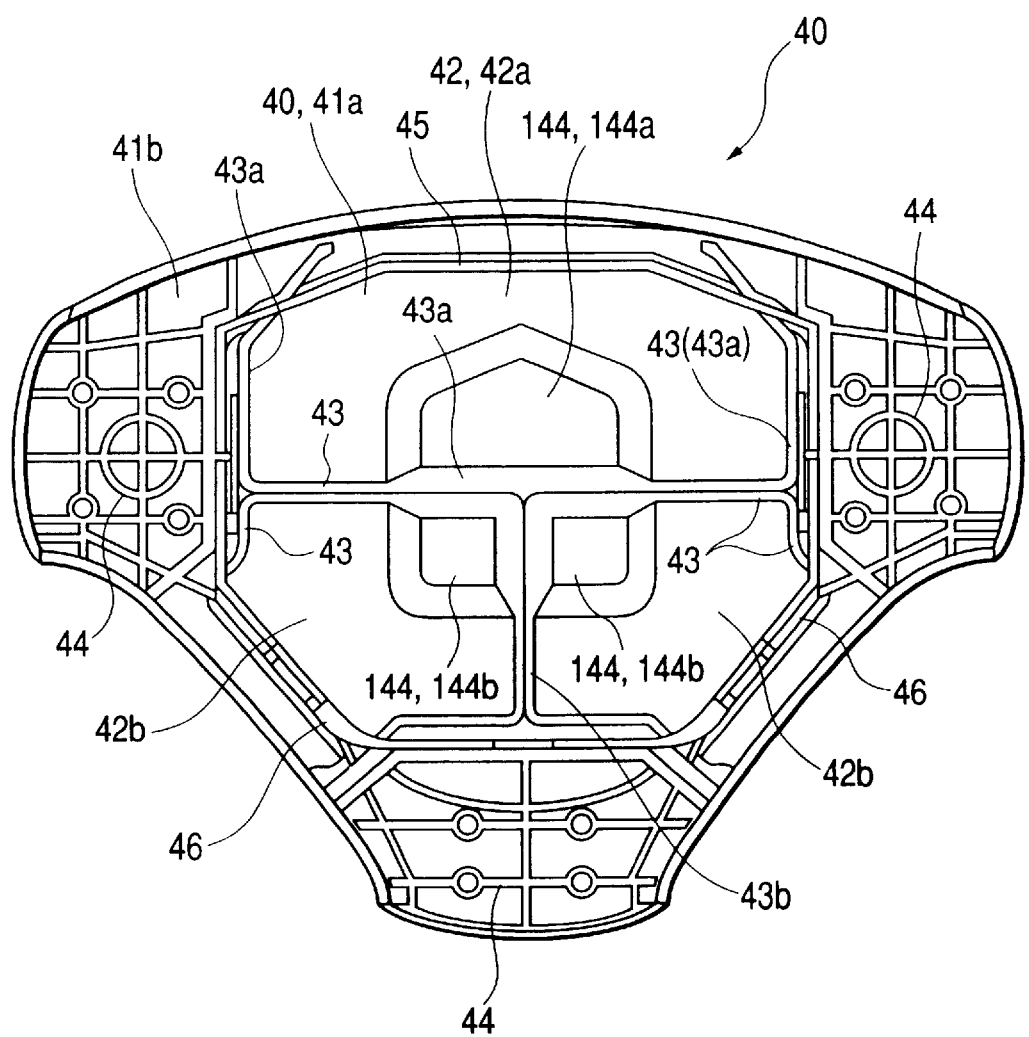
FIG. 19 shows a bottom view of a pad according to another embodiment of the invention.

FIGS. 17–19 show still another embodiment of the present invention. The pad 40 is formed with a cover body portion 41 for covering the upper portion of a boss portion B, and side wall portions 45 and 46 projecting downward from the underside of the cover body portion 41. The cover body portion 41 is disposed in the region surrounded with the side wall portions 46 and 47 and also formed with a body portion 41a for covering the folded air bag 11, and a peripheral edge portion 41b extending toward the coated layer 3 in the region of each spoke portion S around the body portion 41a.

The body portion 41a has an outer peripheral edge substantially similar in shape to that the base wall portion 37 of the bag holder 36 and is formed with a door portion 42 opening when the air bag 11 is inflated. The door portion 42 is formed with a large door portion 42a on the front side of the vehicle, and lateral two small door portions 42b on the rear side thereof. Around each of the door portions 42a and 42b exists a thin-walled portion 43 as a rupture portion to be broken, which has a shape in plan view comprising a substantial U-shape and an inverted-T shape coupled with the U-shape in the longitudinal direction of the vehicle. When the U-shaped region 43a is broken, the door potion 42a is open forward and when the U-shaped region 43a and the inverted-T region 43b are broken, the door portions 42b and 42b are to be laterally tiltably opened backward.

In the center of the body portion 41a, the thick-walled region 144 projecting downward is formed as shown in FIGS. 17–19. The thick-walled region 144 is divided by the recessed groove of the rupture portion 43 to be broken so that the operation of the door portions 42a, 42b and 42b may be made smoothly when the air bag 11 is developed and inflated, the thick-walled region 144 including front thick-walled regions 144a and two rear thick-walled regions 144b and 144b. When viewed from the base, the thick-walled region 144 looks like a home-base pentagon. The area there the thick-walled region 144 is disposed and its thickness are arranged such that the body portion 41a of the cover body portion 41 is allowed to enter the space among folded packs 25, 26 and 27, which will be described later, when the folded air bag 11 is covered at the time of assembling the air bag 11. Even when the thick-walled region 144 is held down, the thick-walled region 144 is set to be supported by part of the air bag 11.

In the air bag system M according to the embodiment of the invention, the region of the body portion 41a in the pad cover body portion 41 positioned above and near the center of the folded air bag 11 is formed with the thick-walled region 144 (144a, 144b and 144b) projecting downward from the periphery. As the thick-walled region 144 has entered the space A1 among the folded packs of the folded air bag 11, the thick-walled region 144 is supported by part of the air bag 11 even though the region 144 is held down during the operation of a horn switch mechanism 9. Thus, the body portion 41a of the pad cover body portion 41 is prevented from partially yielding to pressure.

Consequently, the air bag system M according to the embodiment of the invention ensures the improved touch of the pad 40.

In order to increase the planar configuration of the space A1, the air bag 11 may be contained in the bag holder 36 without mounting the folded regions 25, 26 and 27 on the inflator body 33a as much as possible. In this case, the shape of the air bag 11 in plan view and the area and thickness of the thick-walled region 144 (144a, 144b and 144b) tend to increase. However, the thickness of the air bag 11 including the inflator 33 can greatly be decreased.

Figure 20:
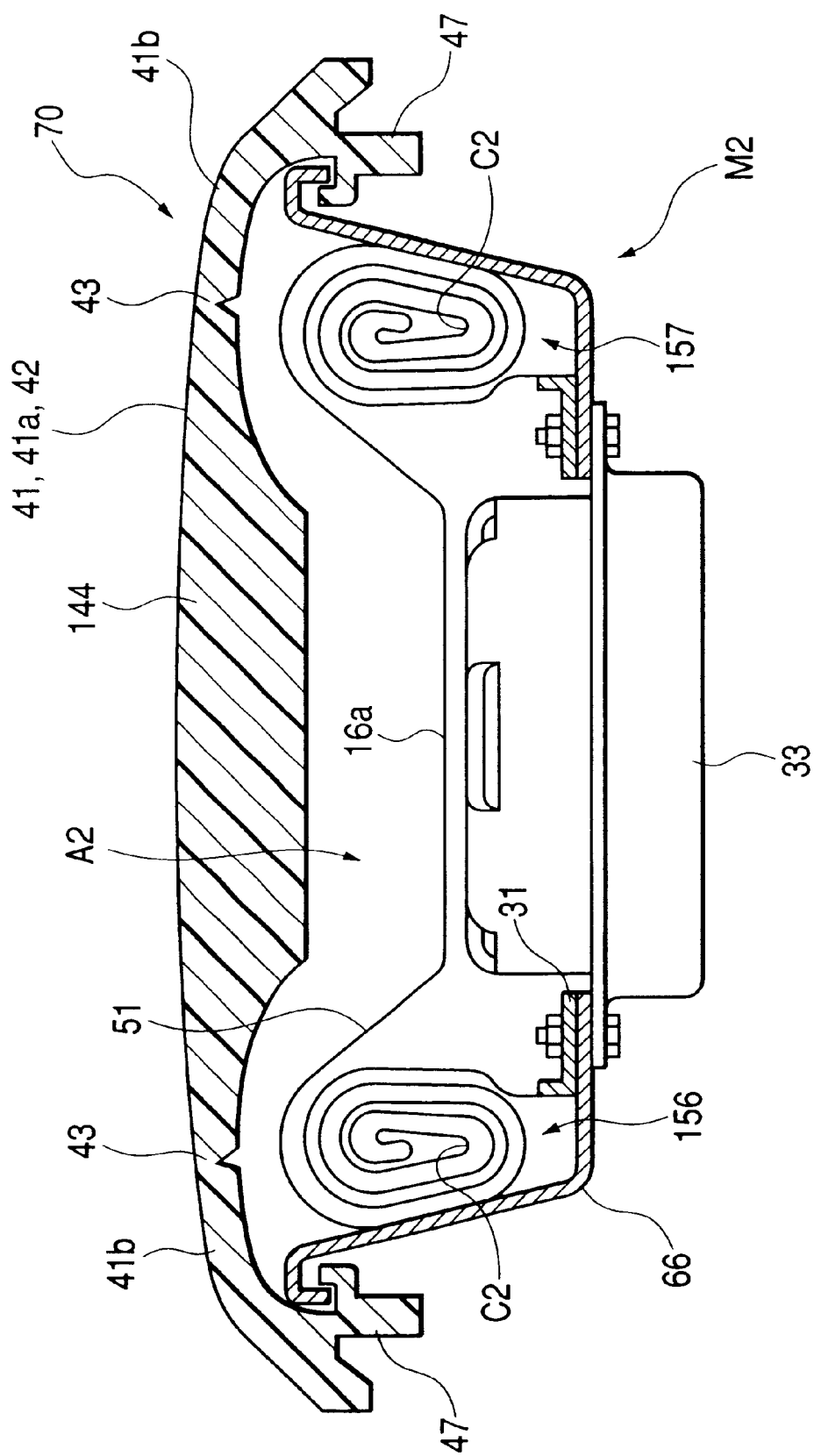
FIG. 20 shows a schematic section view of the air bag system according to still anther embodiment of the invention.
Figure 21:
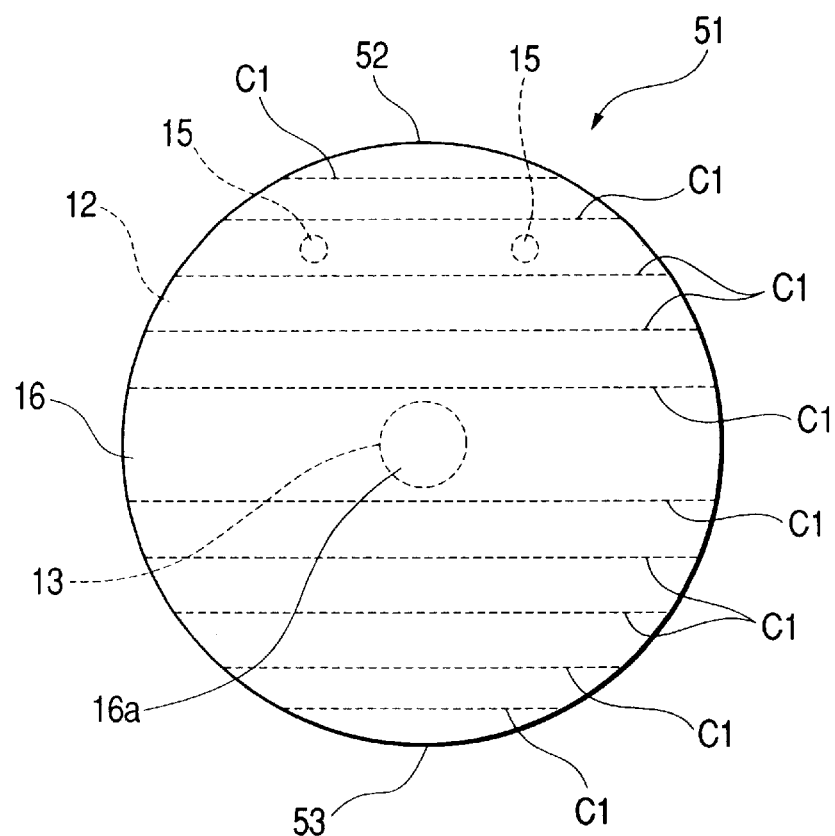
FIG. 21 shows a diagram explanatory of the folding of the air bag at the first stage according to still another embodiment of the invention.
Figure 22:
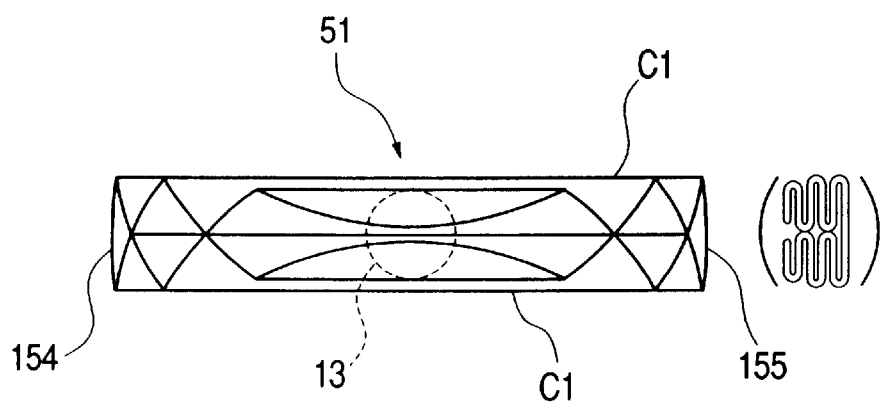
FIG. 22 shows a plane view of the air bag after the first stage of folding according to still anther embodiment of the invention.

Further, the air bag may be folded into two packs. Like an air bag 51 of an air bag system M2 for a steering wheel shown in FIGS. 20–22, for example, the air bag is first flatly developed with its top wall portion 16 which has an opening 13 for introducing an inflation gas and is placed on top of a base wall portion 12 on the side opposite to the opening 13. During the first folding step, a crease C1 is marked in the lateral direction of a vehicle and the longitudinal edges 52 and 53 of the flatly developed peripheral edge are folded like bellows on the side of the top wall portion 16 opposite to the opening 13 in a manner close to the opening 13.

Then during the second step, a longitudinal crease C2 (see FIG. 20) is marked and peripheral edges 154 and 155 on two end portion sides around the opening 13 in a manner close to the opening 13. Further, an outer roll folding method is used to fold the air bag on the side of the top wall portion 16 having the opening 13.

The air bag 51 thus folded up through the two steps may be contained in a bag holder 66 covered with a pad 70.

The region positioned above and near the center of the folded air bag in the pad as an air bag cover is made the thick-walled region 144 projecting downward from the periphery, so that the thick-walled region 144 enters the space A2 between the packs 156 and 157 of the folded air bag 51. Even though the region 44 is held down, the region 244 is supported by part of the air bag 51. Thus the pad 70 is prevented from partially yielding to pressure and operation /working-effect similar to the preceding embodiment of the invention become achievable.

Although the thick-walled regions 144 of the pad 40 and 70 in the air bag systems according to the embodiments of the invention have the tapered peripheral edges as well as substantially uniform wall thickness, because the height of the spaces A1 and A2 is set greatest in the center between the packs 25, 26 and 27 and the center between the packs 156 and 157, the underside of the thick-walled region 44 may be protruded in the form of a crest so as to gradually increase the wall thickness from the peripheral edge to the center between the packs 25, 26 and 27 and the center between the packs 156 and 157 except the region 43 to be broken.

When the wall thickness of the thick-walled region 44 becomes too great, an undercut region may be provided in the underside to decrease the weight of each of the air bag covers 40 and 70 by forming the thick-walled region with a plurality of ribs.

Although the air bag systems to be mounted in the three spoke type steering wheel W has been described in the embodiments of the invention, it may also be mounted in a four spoke type steering wheel too.

Although a description has also been given of the air bag systems to be disposed in the steering wheels W the embodiments of the invention, the invention is not limited to the air bag systems for steering wheels but may be applicable to any air bag system having an air bag that is flatly developed first, and folded closer to the center thereof to form a plurality of packs as well as a space therebetween.

This invention is not limited to the above description of the mode for carrying out the invention and embodiments thereof at all, and includes various modifications that can be conceived by those skilled in the art without departing from the scope of the claims.

What is claimed is:

1. An air bag system including a casing that accommodates an air bag, the air bag comprising:
    a top wall portion;
    a base wall portion opposite to said top wall portion and having an opening for introducing an inflation gas,
    wherein said air bag is folded before it is accommodated in the casing by
        (i) putting said top wall portion on said base wall portion and flattening the air bag,
        (ii) folding peripheral edges in three directions around said opening together closer to said opening to thereby form three end portions, and
        (iii) folding said three end portions so as to be set closer to said opening to thereby form three packs.

2. An air bag system according to claim 1, wherein the folding at (iii) is carried out under an outer roll folding method for winding each of said three end portions on a side of said base wall portion having said opening.

3. An air bag system according to claim 2, wherein said casing is disposed in a boss portion in a center of a steering wheel, and said boss portion includes a space on its front portion side with respect to a ring portion to be held when said steering wheel is turned.

4. An air bag system according to claim 1, wherein the folding at (ii) is carried out under a bellows folding method for folding the peripheral edges in the three directions around said opening on a side of the top wall portion opposite to said opening.

5. An air bag system according to claim 1, wherein said casing is disposed in a boss portion in a center of a three-spoke steering wheel, and said air bag is accommodated in the casing so that only one of said three packs is disposed on a front side of said steering wheel.

6. An air bag system according to claim 1, wherein said casing is disposed in a boss portion in the center of a steering wheel with an inflator for generating said inflation gas disposed in the base wall portion, one of said three packs is disposed on a rear side of said inflator, and two packs are disposed respectively on a lateral side of said inflator.

7. An air bag system according to claim 1, wherein said casing has an inflator for generating said inflation gas disposed in the base wall portion, and housing at least one pack in said casing with part of said at least one pack being mounted on said inflator.

8. An air bag system, comprising:
    an air bag having a base wall portion and a top wall portion, and which is folded in a manner such that its periphery is located substantially closer to a center thereof than when the air bag is not folded;
    a casing for accommodating said folded air bag;
    an air bag cover disposed above said casing to thereby cover said folded air bag, said air bag cover having a thick-walled region formed at a location above a central area where a plurality of packs of said folded air bag are not located so that the thick-walled region protrudes downward from a remaining portion of said air bag cover
    wherein said air bag is accommodated in the casing by
        (i) flattening said air bag with its base wall portion having an opening for introducing an inflation gas being placed on a top wall portion opposite to the opening,
        (ii) folding peripheral edges in three directions around said opening so as to be set closer to said opening to thereby form three end portions, and
        (iii) folding said three end portions so as to be set closer to said opening to thereby form three packs.

* * * * *